(12) United States Patent  (10) Patent No.: US 7,954,906 B2
Montague et al.  (45) Date of Patent: Jun. 7, 2011

(54) QUICK RELEASE BICYCLE WHEEL

(75) Inventors: David Montague, Newton, MA (US); Harry Montague, Brookline, MA (US)

(73) Assignee: David Montague, Newton, MA (US)

( * ) Notice: Subject to any disclaimer, the term of this patent is extended or adjusted under 35 U.S.C. 154(b) by 0 days.

(21) Appl. No.: 12/652,901

(22) Filed: Jan. 6, 2010

(65) Prior Publication Data

US 2010/0109425 A1    May 6, 2010

Related U.S. Application Data

(60) Division of application No. 11/489,546, filed on Jul. 20, 2006, now Pat. No. 7,661,767, which is a continuation-in-part of application No. 11/219,652, filed on Sep. 7, 2005, now abandoned.

(51) Int. Cl.
    *B60B 35/00*    (2006.01)
(52) U.S. Cl. .................................. 301/124.2; 301/110.5
(58) Field of Classification Search ............... 301/124.2, 301/110.5, 132; 280/279, 280, 288
    See application file for complete search history.

(56) References Cited

U.S. PATENT DOCUMENTS

| 331,805 A | 12/1885 | McCalop |
|---|---|---|
| 2,630,020 A | 3/1953 | Juy |
| 3,610,659 A | 10/1971 | Gerarde |
| 4,033,627 A | 7/1977 | Morroni |
| 4,079,958 A | 3/1978 | Segawa |
| 4,400,038 A | 8/1983 | Hosokawa |
| 4,724,692 A | 2/1988 | Turin |
| 4,763,957 A | 8/1988 | Poehlmann |
| 4,789,206 A | 12/1988 | Ozaki |
| 4,906,053 A | 3/1990 | Kawai |
| 4,964,287 A | 10/1990 | Gaul |
| 5,121,973 A | 6/1992 | Phillips |
| 5,364,115 A | 11/1994 | Klein |
| 5,383,716 A | 1/1995 | Stewart |
| 5,567,020 A | 10/1996 | Phillips et al. |
| 5,576,020 A | 11/1996 | Iritani et al. |
| 5,653,512 A | 8/1997 | Phillips |
| 5,673,925 A | 10/1997 | Stewart |
| 5,961,186 A | 10/1999 | Phillips |
| 6,089,675 A | 7/2000 | Schlanger |

(Continued)

FOREIGN PATENT DOCUMENTS

FR    983137    6/1951

(Continued)

*Primary Examiner* — Kip Kotter
(74) *Attorney, Agent, or Firm* — Sughrue Mion, PLLC

(57) ABSTRACT

A wheel quick release system for a bicycle or other wheeled vehicle where the wheel can be easily removed by a manual operation on only one side of the wheel hub but is prevented from unexpected separation at all times while engaged with the wheel. A laterally moving skewer mounted concentrically inside a hollow axle is equipped with a "non-touch" nut on one end and is spring loaded toward a quick release cam on the other end thereby always urging the nut against the adjacent dropout. To remove the wheel, the quick release cam is operated and the quick release side assembly is pushed axially inward and a safety mechanism is operated and held in this position while the wheel is removed from the fork dropouts. When the wheel is again inserted into the wheel fork, the skewer automatically locks onto the dropouts, and subsequently if the quick release cam is inadvertently left open by the user, the wheel will be somewhat loose but will remain safely inserted in the wheel mounts. In this way, if the bicycle or wheeled vehicle looks safe to ride, it is safe to ride.

18 Claims, 25 Drawing Sheets

| U.S. PATENT DOCUMENTS | | | | FOREIGN PATENT DOCUMENTS | | |
|---|---|---|---|---|---|---|
| 6,241,322 B1 | 6/2001 | Phillips | | | | |
| 6,260,931 B1 | 7/2001 | Stewart | FR | | 995747 | 12/1951 |
| 6,454,363 B1 | 9/2002 | Vignocchi | GB | | 658726 | 10/1951 |
| 7,000,995 B2 | 2/2006 | Hagelthorn | IT | | 463954 | 2/1951 |

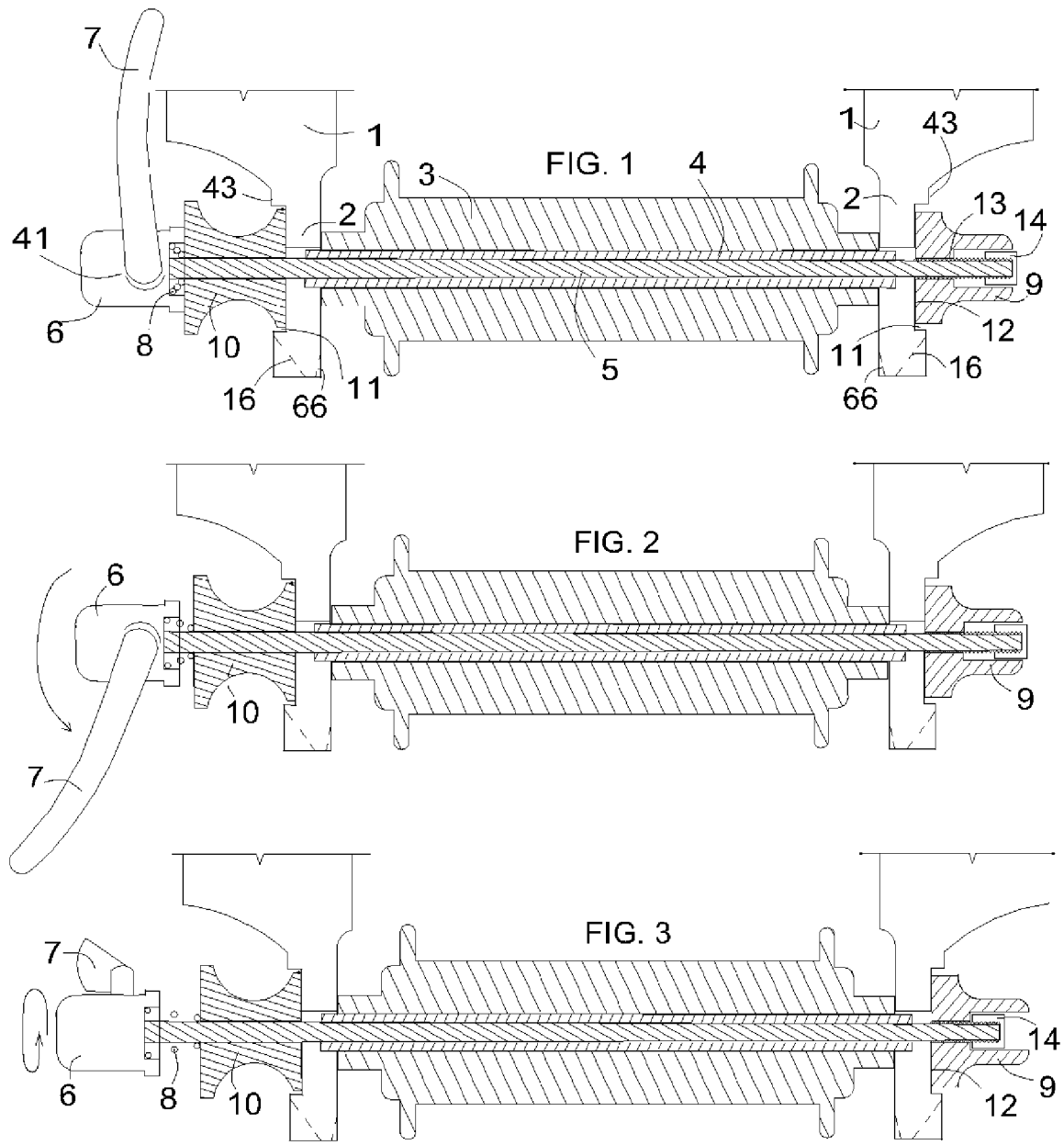

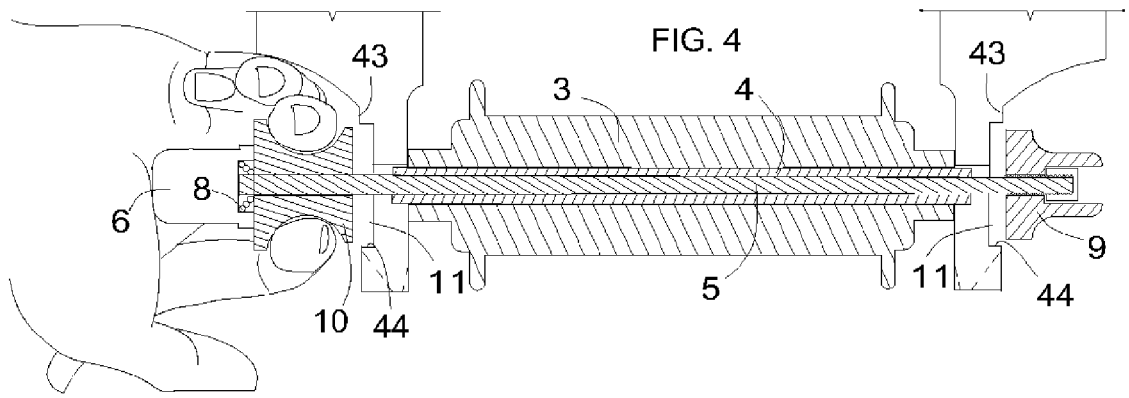
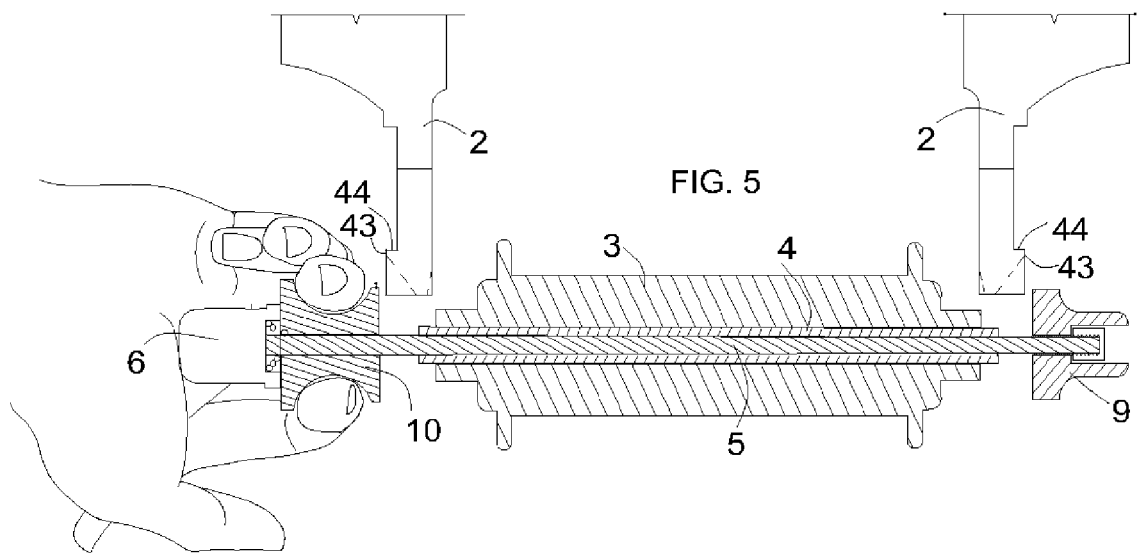
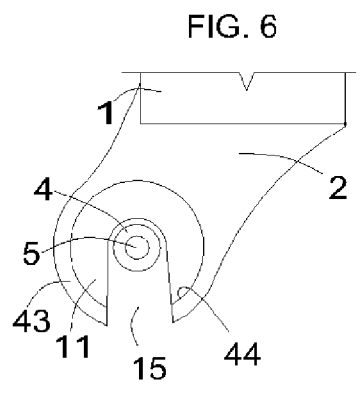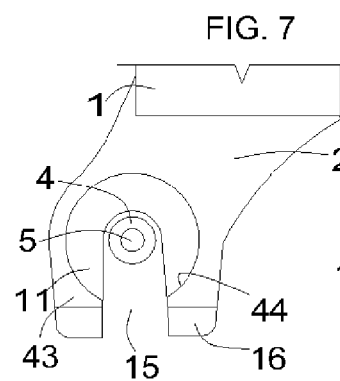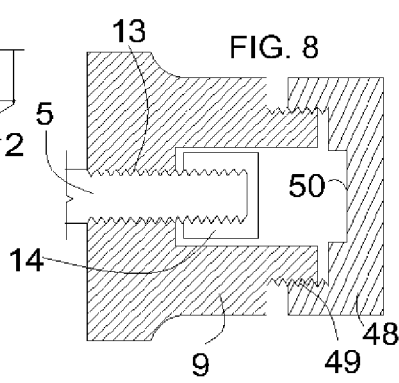

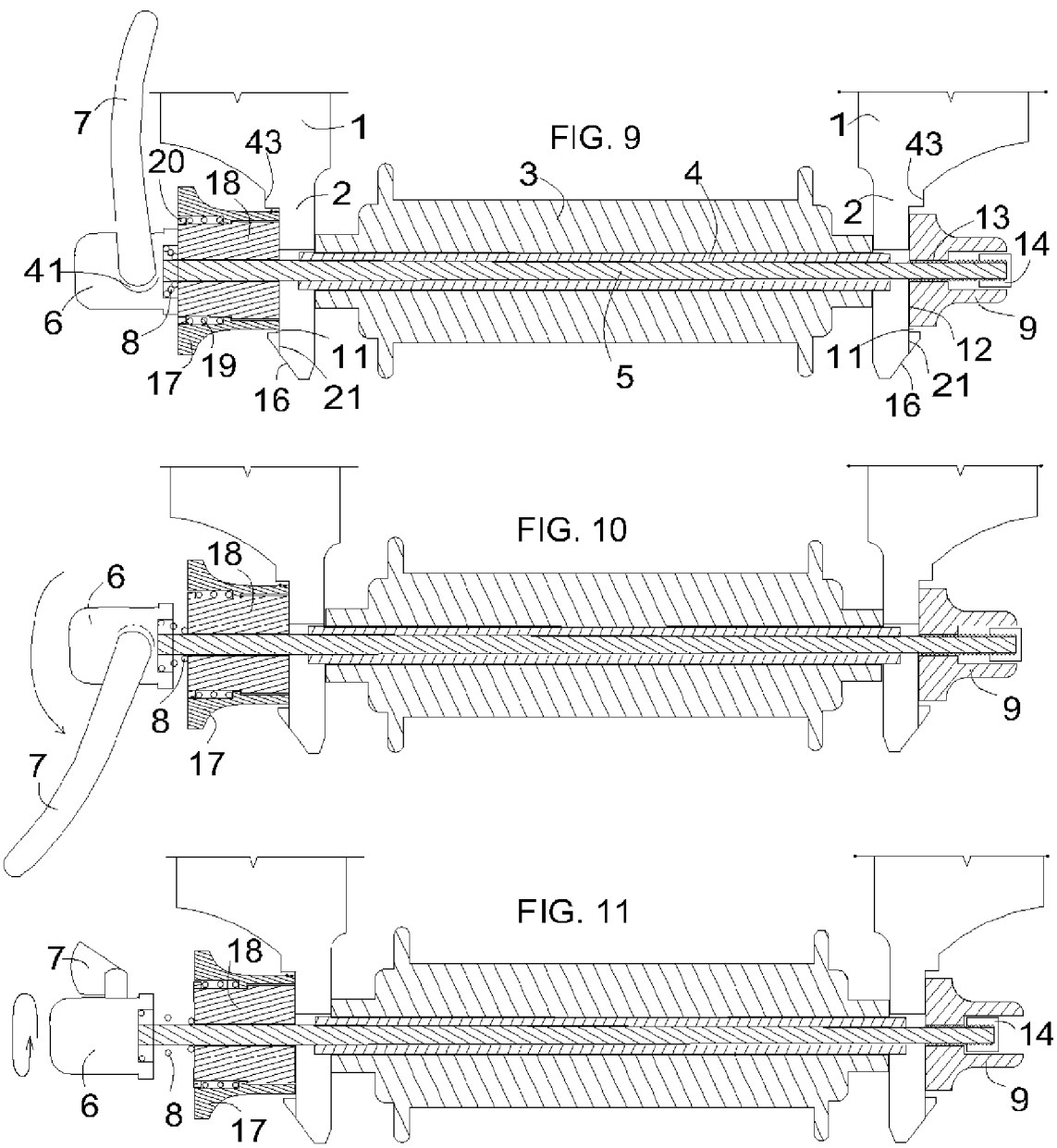

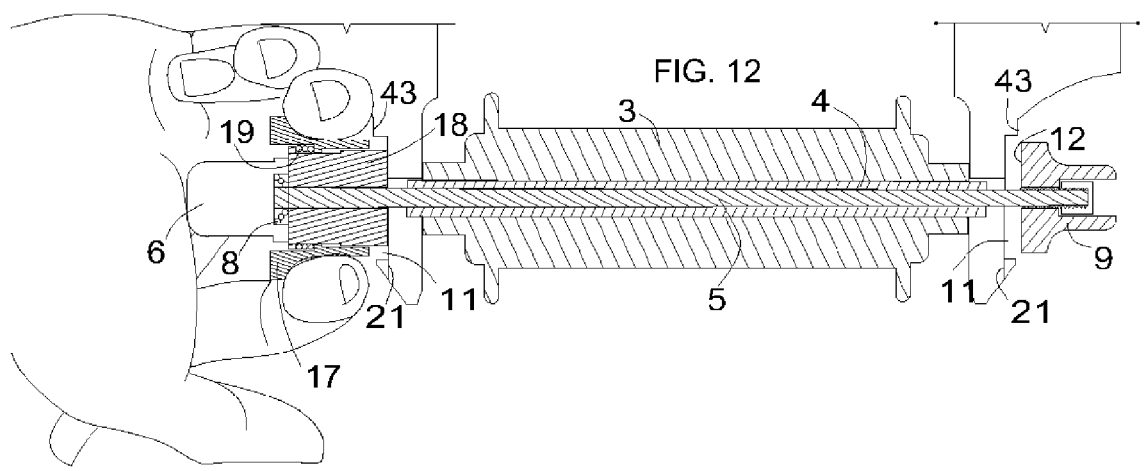
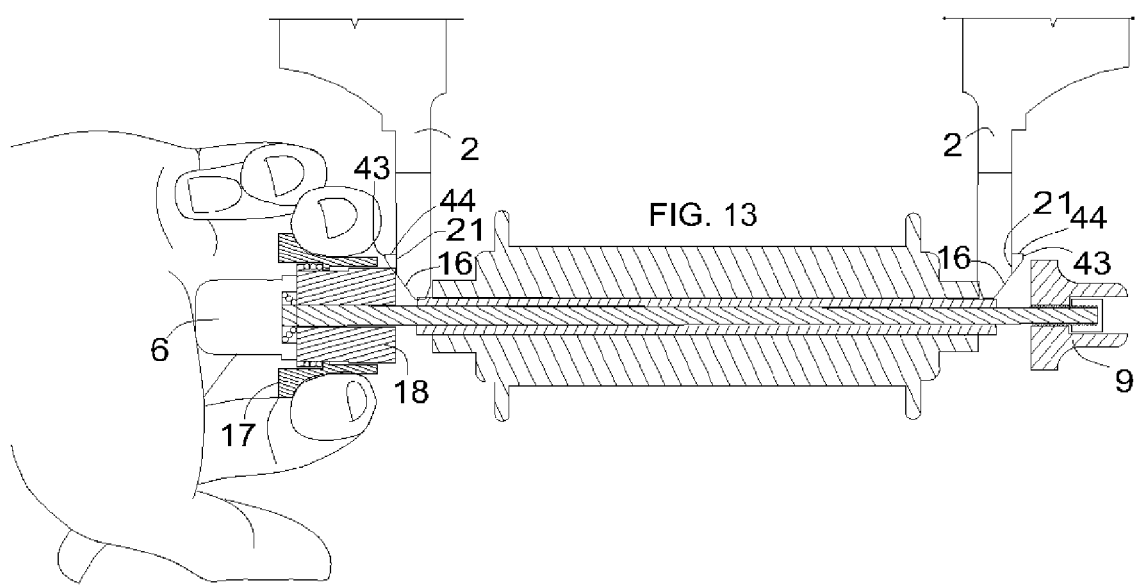
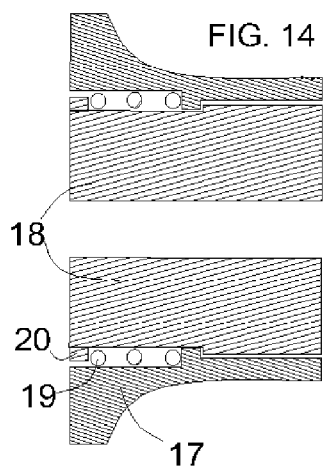
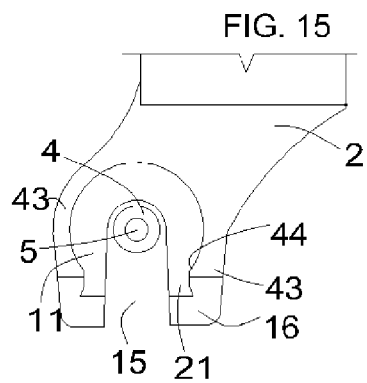

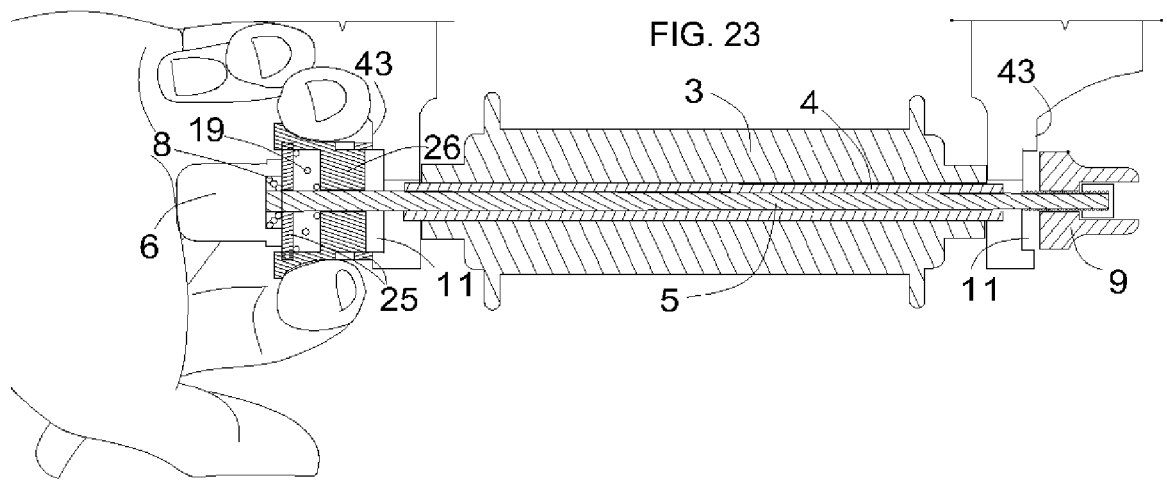
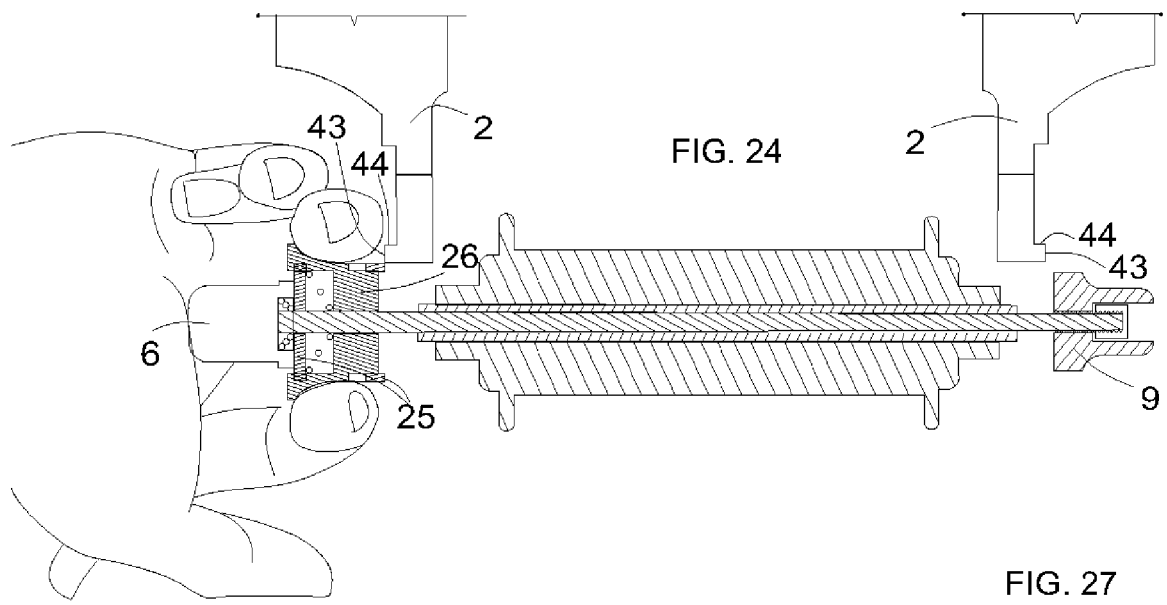
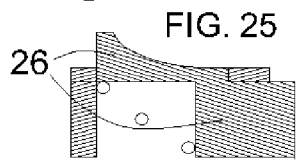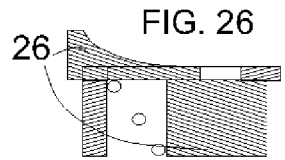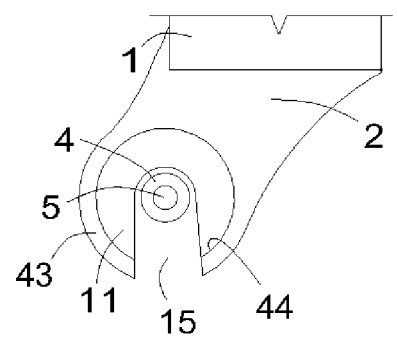
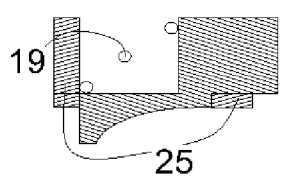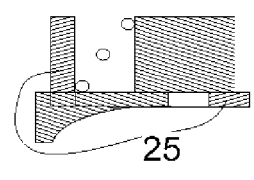

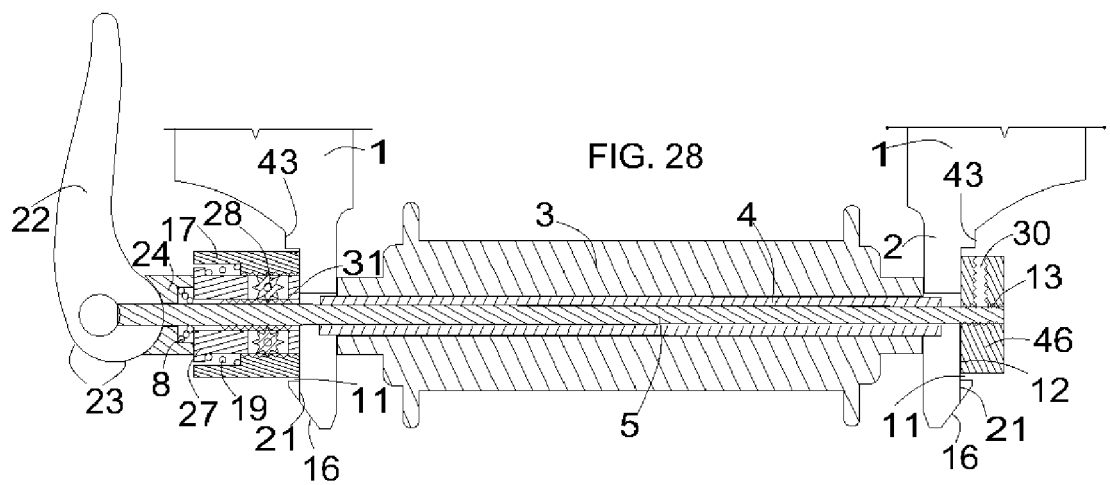
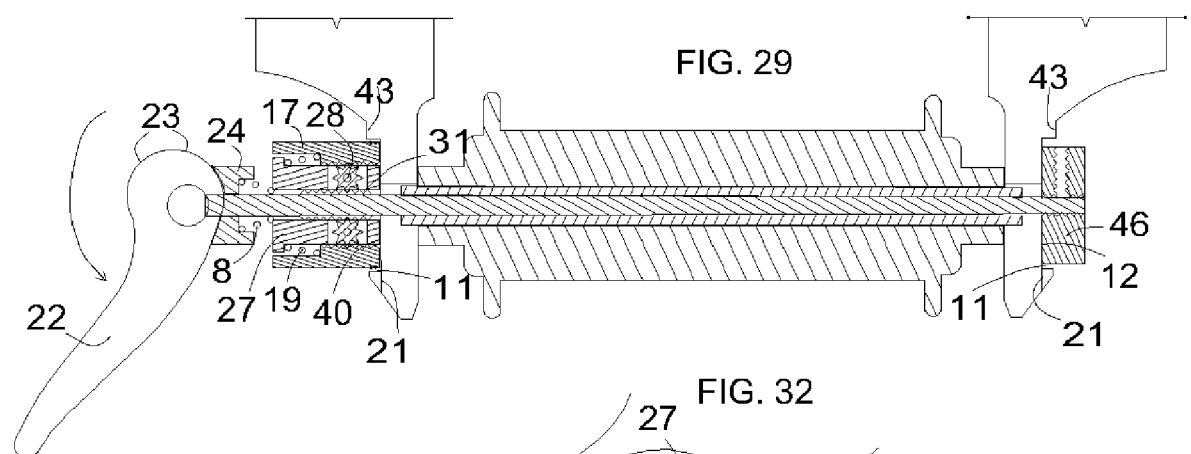
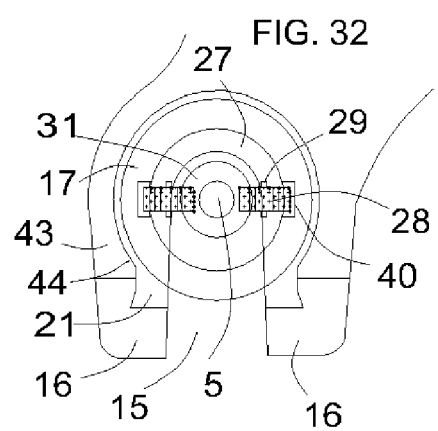

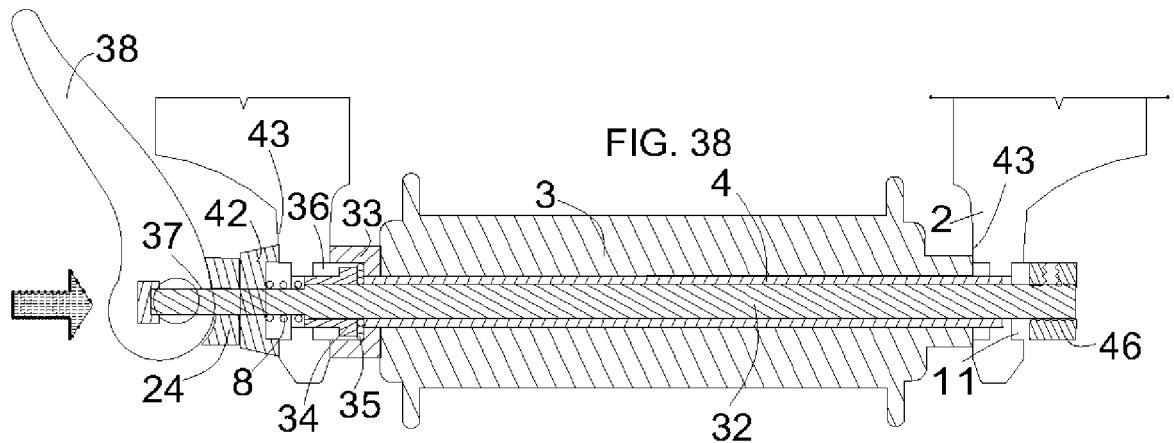
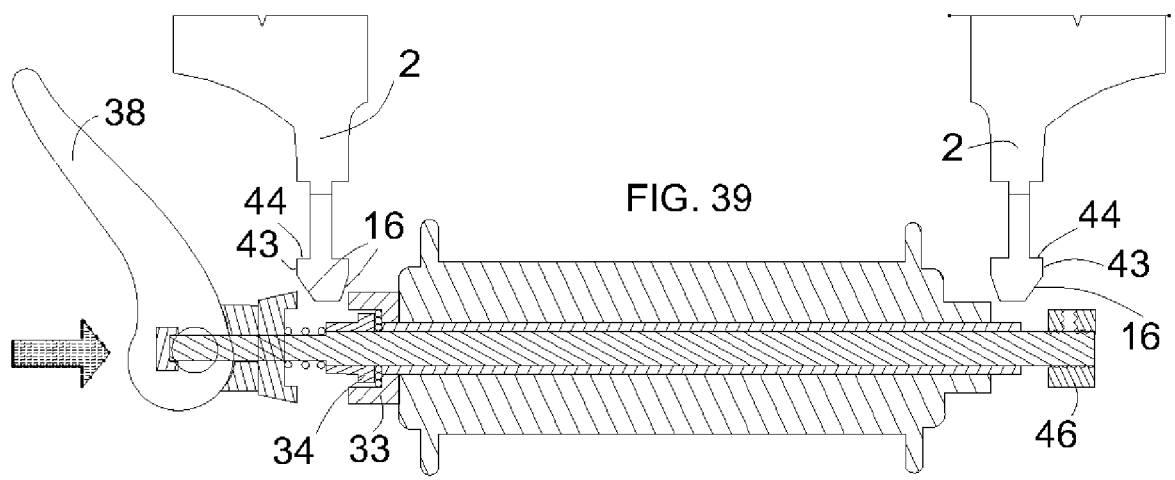
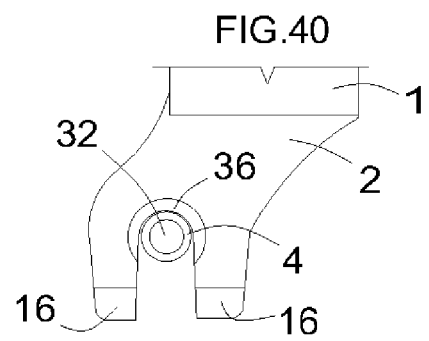

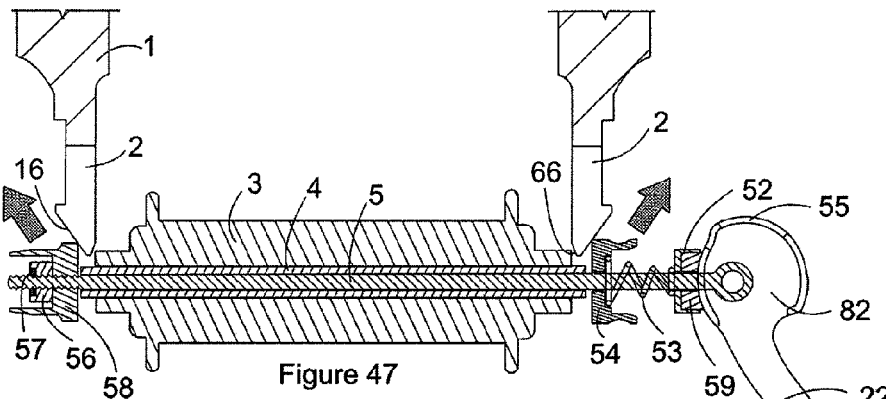
Figure 47
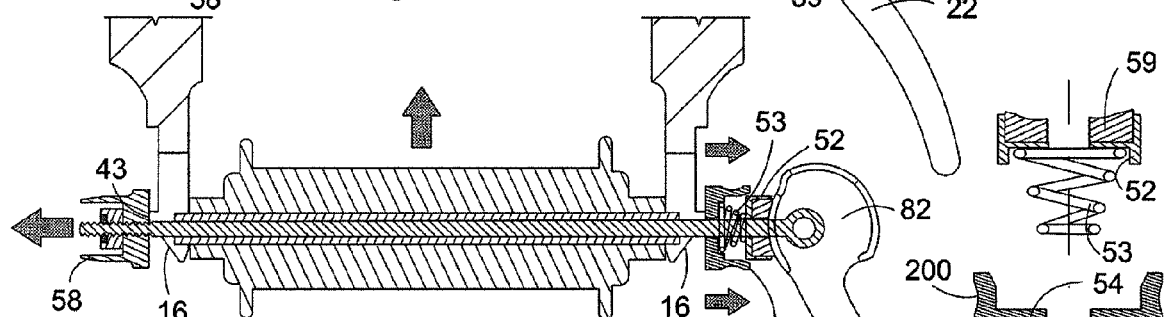
Figure 48
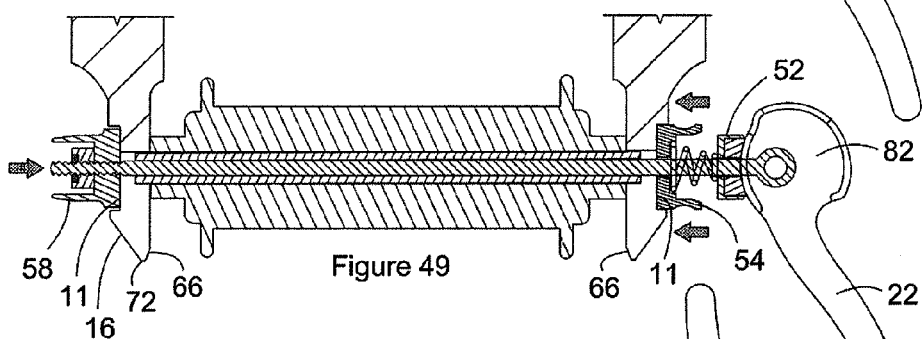
Figure 49
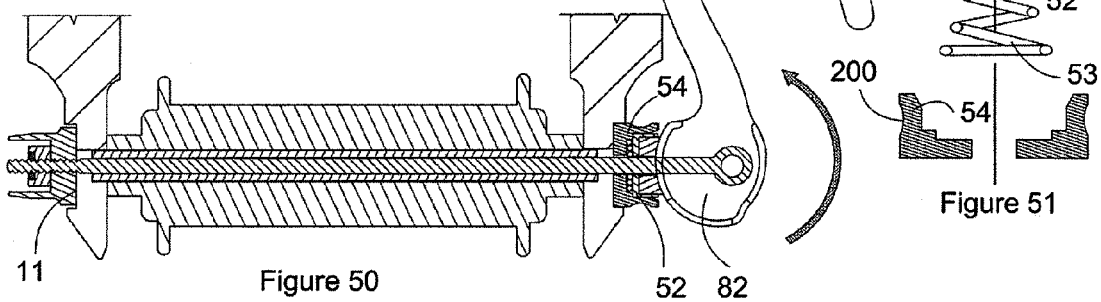
Figure 50
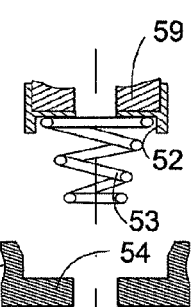
Figure 52
Figure 51

A>B

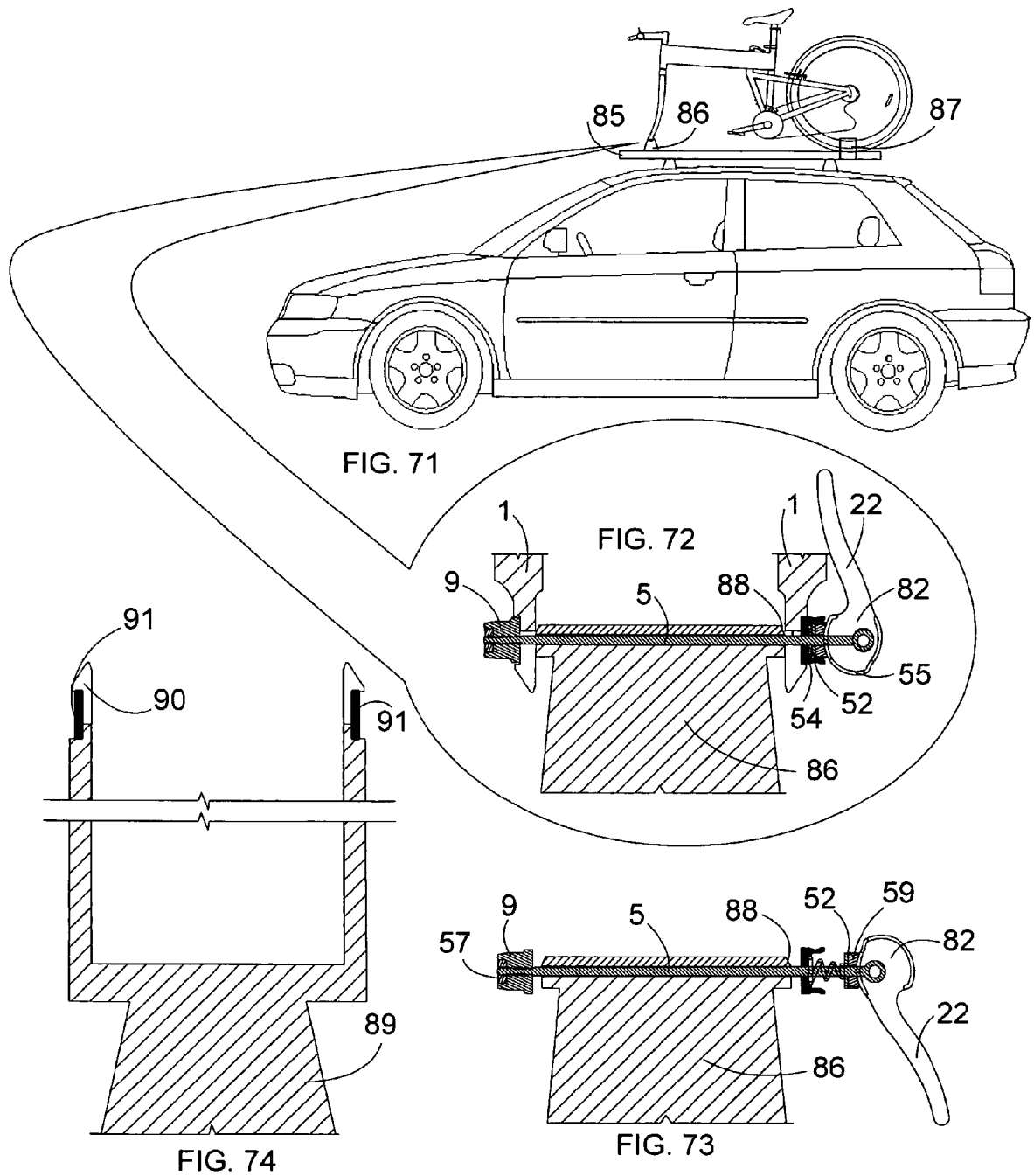

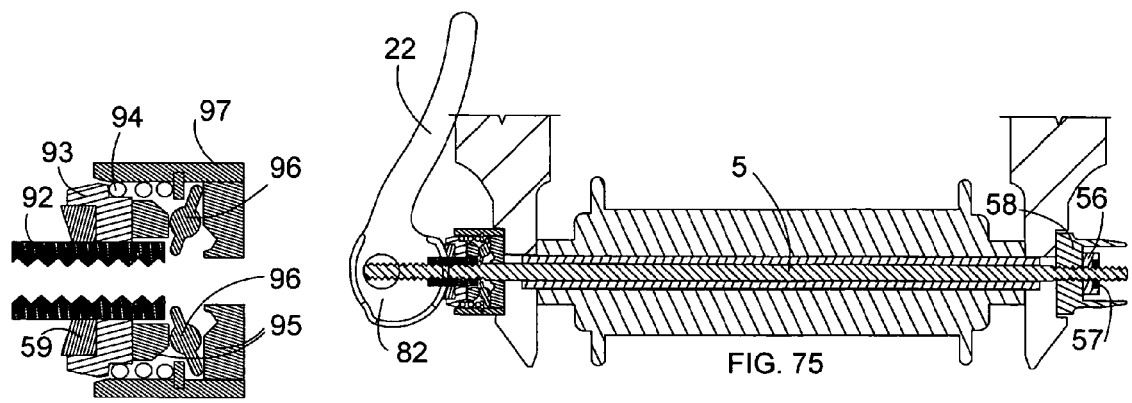
FIG. 75
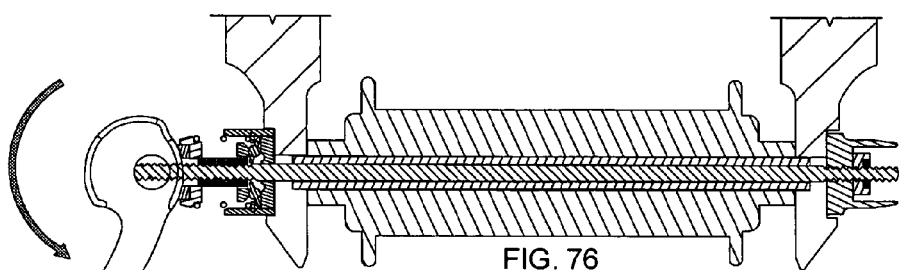
FIG. 79
FIG. 76
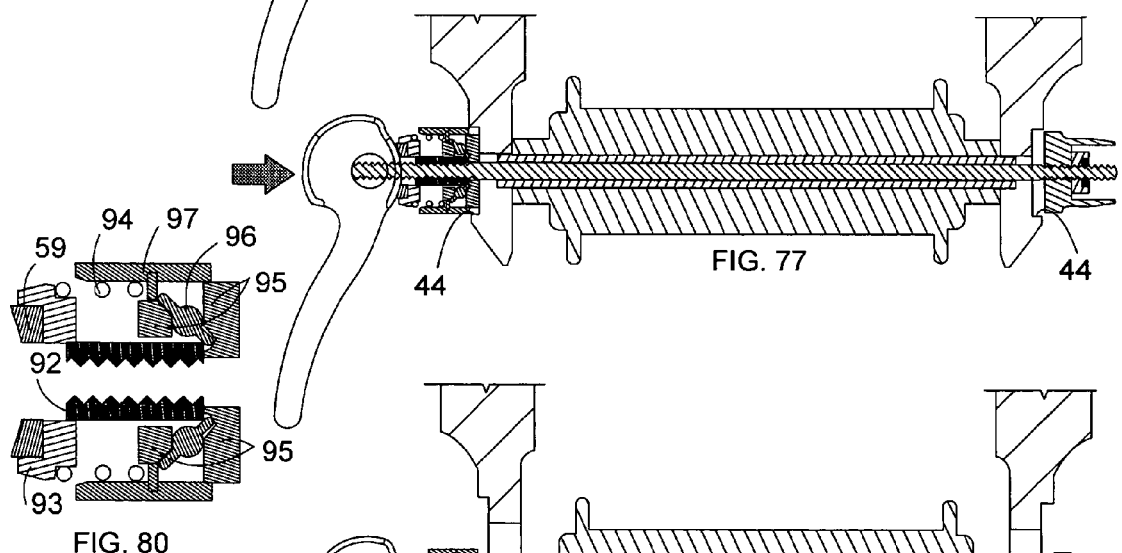
FIG. 77
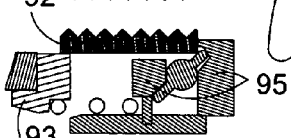
FIG. 80
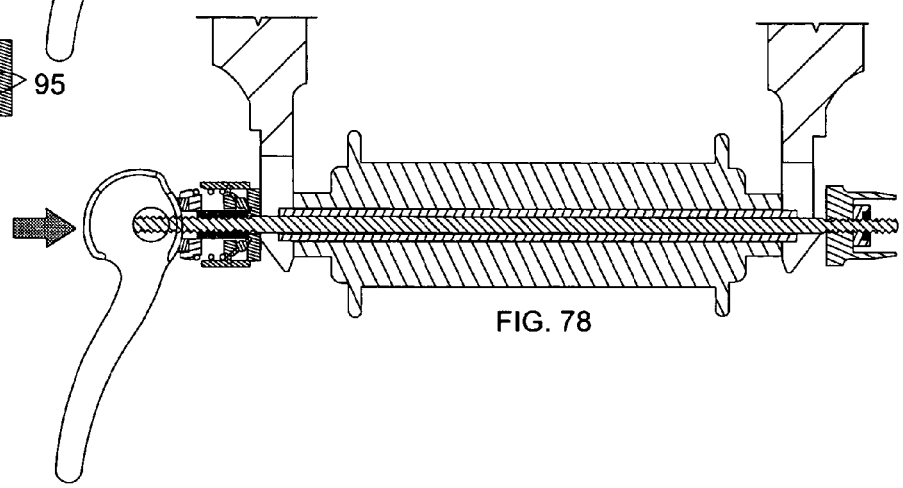
FIG. 78

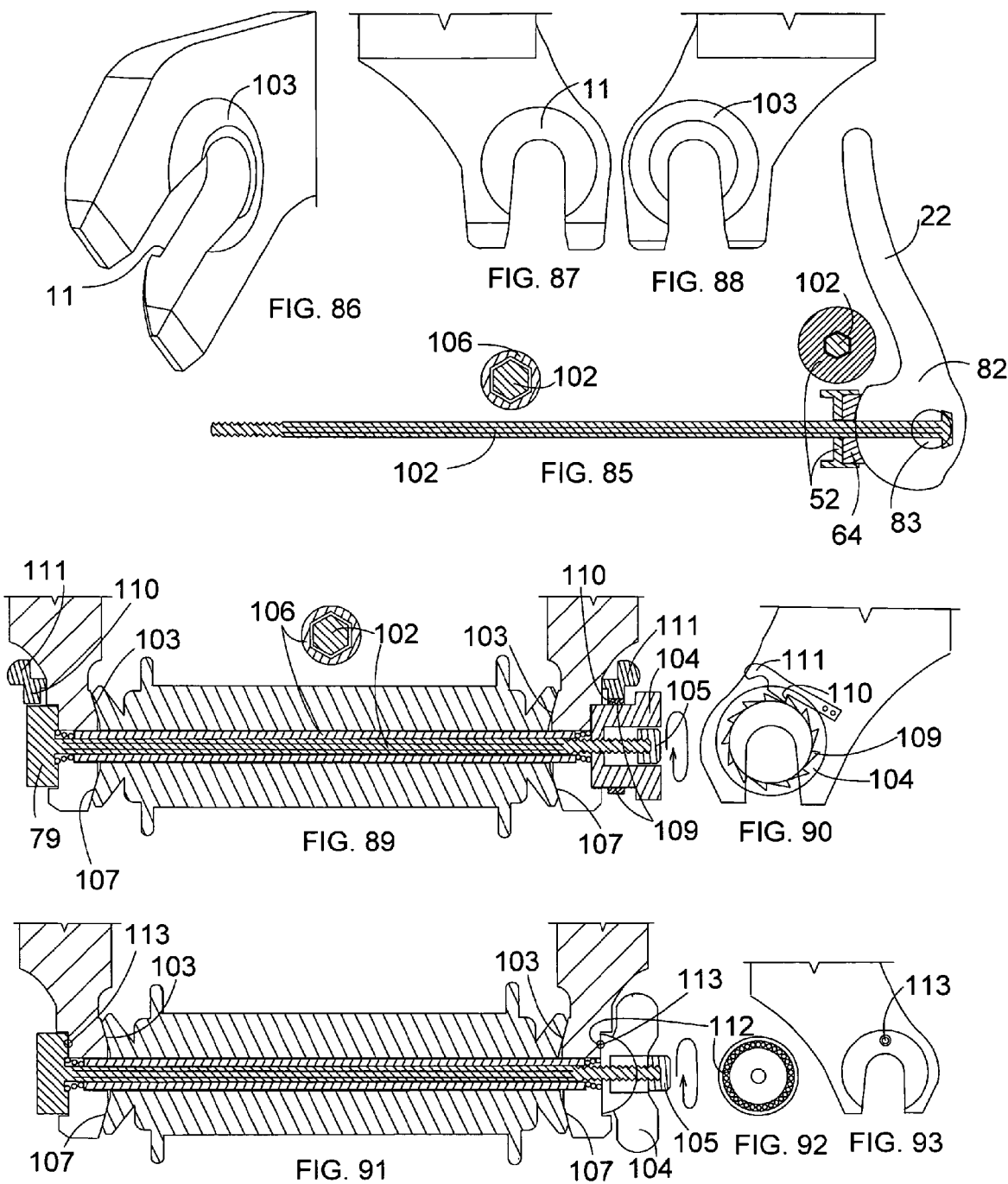

QUICK RELEASE BICYCLE WHEEL

This is a divisional application of U.S. Ser. No. 11/489,546 filed on Jul. 20, 2006 (now allowed), which is a continuation-in-part of U.S. Ser. No. 11/219,652 filed on Sep. 7, 2005 (now abandoned), all of which are incorporated herein by reference.

BACKGROUND OF THE INVENTION

1. Field of the Invention

This invention relates in general to wheeled vehicles such as bicycles. In particular, this invention relates to an apparatus and the method of attaching a hollow axle wheel to a wheel mount wherein the wheel can be removed easily without the use of tools by operations on only one side of the wheel hub but will not unexpectedly separate from the wheel mounts.

2. Description of Prior Art

Most better-quality bicycles on the market are equipped with quick release front (and sometimes rear) wheels. These bicycles use a standard method of avoiding unwanted separation of the front wheel comprising a recessed wheel mount (or dropout), or small tabs which retains the wheel skewer at both ends, and thus the wheel, even when the quick release cam has been loosened. As used herein, the term "skewer" or "wheel skewer" is also known in the industry as a "spindle", "draw bar", "connecting rod", "control shaft" and "retaining rod".

On bicycles currently on the market, the skewer is mounted concentrically inside a hollow hub axle and is equipped with a quick release cam on one end, and an adjusting threaded nut on the other end. The skewer assembly is kept centered laterally in the wheel hub by two conical springs, one on each side, which push outward opposing each other, one on the quick release cam and the other on the nut. The quick release cam, when locked, pulls the skewer outward thereby pushing inward against the dropout as well as causing the distal nut to push inward on the opposite dropout.

In this way, the dropouts are clamped between the quick release cam and the hub on one side of the hub, and between the nut and the hub on the other side of the hub. The dropouts on most bicycles are equipped with either raised tabs, or in many cases, the surfaces upon which the quick release and the nut push are recessed below the rest of the dropout surface. The single process of opening the quick release cam does not produce enough "throw" to allow the quick release and the nut to clear the recess or tabs to exit from the dropout. Therefore, while holding the quick release with one hand, the nut must be further unscrewed from the threaded skewer before the wheel can be removed from the dropouts. In this way, unexpected separation of the front wheel is usually avoided.

However, when the wheel is re-inserted into the dropouts, the adjusting nut remains unscrewed and the wheel, while looking like it is attached to the bicycle or other wheeled vehicle, is not. In this "dangerous state" condition the bicycle is extremely dangerous as it appears to be rideable, but the front wheel can easily separate from the wheel fork. Only a close look at the condition of the quick release and nut will tell the rider that the wheel has not been secured for riding.

In short, the system used on current bicycles relies on the rider to remember to screw on the adjusting nut, and then lock the quick release. In addition, in order to do this, the rider must hold the bicycle up with one hand, hold the quick release on one side of the bicycle with another hand, and turn the adjusting nut on the opposite side of the bicycle with yet another hand-making the process of safely fastening a wheel difficult at best for the average rider with only two hands. Furthermore, the process of adjusting the nut to the correct tension such that the quick release cam operates properly is found to be challenging by many riders.

Several attempts have been made to solve some of these problems, however, none have yielded a satisfactory solution to both avoiding the "dangerous state" as well as making the process easy with only two hands.

Many recent attempts have been made to provide a system which does not require the adjustment of the adjustable nut to the correct tension for proper quick release cam locking (see U.S. Pat. No. 6,260,931 {Stewart}, U.S. Pat. No. 6,241,322 {Phillips}, U.S. Pat. No. 5,961,186 {Phillips}, U.S. Pat. No. 5,673,925 {Stewart}, U.S. Pat. No. 5,653,512 {Phillips}, and U.S. Pat. No. 5,121,973 {Phillips}.). The '973 patent has a primary locking device operated from one side of the wheel.

U.S. Pat. No. 6,260,931 (Stewart) discloses a quick release bicycle wheel wherein the quick release cam lever is spring loaded urging it to the closed position. If it is assumed that the adjusting nut is not unscrewed too far, this device solves the problem of avoiding the "dangerous state". However, in order to install the wheel on the bicycle, the operator must hold the bicycle with one hand, hold the quick release lever engaged with another hand, and insert the wheel with a third hand which could prove to be difficult for the average rider. It is possible that the rider, absent any instructions, might unscrew the adjusting nut in order to install the wheel on the fork and then use the quick release lever as a "wing nut" handle.

U.S. Pat. No. 6,241,322 (Phillips) discloses a quick release bicycle wheel wherein the installation of the wheel to the wheel fork is made slightly easier by fixing the distance the adjustable nut must be tightened in order for correct quick release cam fastening. However, this device does not avoid the "dangerous state" condition, nor does it prevent the nut from being loosened too far and falling off the skewer.

U.S. Pat. No. 6,089,675 (Schlanger) discloses an invention wherein the wheel is attached to a more traditional slot on one dropout and a threaded hole on the other dropout. The Axle/skewer comprises a large knob on one end and a threaded area on the other end. This system also does not avoid the "dangerous state" wherein the wheel could appear to be mounted to the wheel fork for riding however the wheel is not secured.

U.S. Pat. No. 5,961,186 (Phillips), U.S. Pat. No. 5,673,925 (Stewart), and U.S. Pat. No. 5,653,512 (Phillips) all disclose essentially the same concept of an expanding nut on the opposite side of the axle skewer from the quick release cam. This nut reduces in width either by rotation or by a push/pull action taken by the rider thereby allowing the nut and the opposite side quick release to clear the safety tabs and the wheel to be removed. These three devices all require the rider to unlock the quick release cam on one side of the wheel, then move to the other side of the wheel to reduce the width of the opposite nut.

Various other efforts have been made to design a system that would allow the easy removal of a bicycle wheel while making sure it did not detach unexpectedly. None have provided both ease of use and absolute safety. For example, U.S. Pat. No. 5,576,020 defines an approach, using manually operated primary and secondary locking devices where operation on both sides of the wheel occurs to effectuate both attachment and detachment.

SUMMARY OF THE INVENTION

The objective of the present invention is to provide a wheel release system that is fool-proof, safe, and easy and intuitive to use by the inexperienced rider with no instructions. In addition, the system must be light weight, simple, and inexpensive to manufacture.

This objective is achieved in a system wherein the wheel can be easily removed by a manual operation on one side of the wheel but is prevented from unexpected separation at all times while engaged with the wheel. A laterally moving skewer mounted concentrically inside a hollow axle is equipped with a "non-touch" nut on one end and is spring loaded toward a quick release cam on the other end wherein in order to remove the wheel, the quick release cam is operated and in some cases the cam is then spun to loosen the adjusting nut, then the cam side assembly is squeezed and/or pushed axially inward and held in this position while the wheel is removed from the fork dropouts. When the wheel is again inserted into the wheel fork, the skewer automatically locks onto the dropouts, and subsequently if the quick release cam is inadvertently left open by the user, the wheel will be somewhat loose but will remain safely inserted in the wheel mounts. In this way, if the bicycle or wheeled vehicle looks safe to ride, it is safe to ride.

Fork dropouts used with the present invention can either be of the standard variety found on most bicycles or can be equipped with ramps on the exterior and, if desired, interior faces of the dropouts. If no ramps are used, the rider can still hold the bicycle up with one hand and squeeze and hold the quick release and safety cylinder with the other hand while inserting the wheel hub into the dropouts. Once the wheel is inserted and the rider releases squeezing the cam and safety cylinder, the wheel automatically locks onto the dropouts. If the dropouts are equipped with ramps, the spring loaded quick release cam assembly rides up the ramp and automatically locks when the hub axle enters the riding position in the dropout. This system can be used on both the front and rear wheels of a vehicle or bicycle or on a system to hold the wheel or wheel mount of a vehicle or bicycle to another vehicle or bicycle.

BRIEF DESCRIPTION OF THE DRAWINGS

The illustrations and drawings shown are not intended to limit the scope of this invention, as it is described in the claims, and are provided as a subset of the present invention. The drawings are grouped as follows.

FIGS. 1 through 8 show a first preferred embodiment wherein a single member, mounted axially on the skewer adjacent to the quick release, acts as a safety device and transmits the quick release binding forces. FIGS. 1 through 5 are a sequence showing the operation of removing the wheel.

FIG. 1 is a cross-section showing the quick release locked and the front wheel hub in the riding position.

FIG. 2 is a cross-section showing the quick release in the unlocked position but where the hub cannot come off.

FIG. 3 is a cross-section showing the quick release having been rotated, increasing the "throw" and unscrewing the skewer in the adjusting nut. In this state the hub still can not come off.

FIG. 4 is a cross-section showing the quick release squeezed onto the single member safety device forcing it and the remote adjusting nut each out of their respective dropout recesses.

FIG. 5 is a cross-section showing the wheel hub removed from the dropouts.

FIG. 6 is a side view showing a conventional dropout which can be used with the preferred embodiment.

FIG. 7 is a side view showing a non-standard dropout modified with ramps which spread the safety device and nut so that they automatically fall into a fastened position when the wheel is re-installed.

FIG. 8 is a cross section showing the "non-touch" adjusting nut modified to have a rotation limit control cap. The nut is adjusted such that it will stop threading outward at the correct position for wheel removal, and will stop threading inward at the correct position for proper quick release cam tension.

FIGS. 9 through 15 show a second preferred Embodiment having a two part device, one member is the safety component and the other member transmits the force of the quick release and holds the skewer centered during wheel removal. FIGS. 9 through 13 are a sequence showing the operation of removing the wheel.

FIG. 9 is a cross-section showing the quick release locked and the wheel hub in the riding position.

FIG. 10 is a cross-section showing the quick release in the unlocked position but where the hub cannot come off.

FIG. 11 is a cross-section showing the quick release having been rotated, increasing the "throw" and unscrewing the skewer in the adjusting nut. In this state the hub still can not come off.

FIG. 12 is a cross-section showing the quick release squeezed onto the device forcing the safety component and the remote adjusting nut each out of their respective dropout recesses while centering the assembly.

FIG. 13 is a cross-section showing the wheel hub removed from the dropouts.

FIG. 14 is a detailed cross section of the two part device.

FIG. 15 is a side view showing a dropout with a dropout recess slide area for centering the skewer during wheel removal.

FIGS. 16 through 19 are a sequence showing wheel removal.

FIG. 16 is a cross-section showing the quick release locked and the wheel hub in the riding position.

FIG. 17 is a cross-section showing the quick release in the unlocked position but where the hub cannot come off.

FIG. 18 is a cross-section showing the quick release squeezed onto the device forcing the safety component and the remote non-rotatable nut each out of their respective dropout recesses while centering the assembly.

FIG. 19 is a cross-section showing the wheel hub removed from the dropouts.

FIGS. 20 through 27 show a third preferred embodiment having a two part device, one member is the safety component and the other member transmits the force of the quick release and holds the skewer centered during wheel removal. FIGS. 20 through 24 are a sequence showing the operation of removing the wheel.

FIG. 20 is a cross-section showing the quick release locked and the wheel hub in the riding position.

FIG. 21 is a cross-section showing the quick release in the unlocked position but where the hub cannot come off.

FIG. 22 is a cross-section showing the quick release having been rotated, increasing the "throw" and unscrewing the skewer in the adjusting nut. In this state the hub still can not come off.

FIG. 23 is a cross-section showing the quick release squeezed onto the device forcing the safety component and the remote adjusting nut each out of their respective dropout recesses while centering the assembly.

FIG. 24 is a cross-section showing the wheel hub removed from the dropouts.

FIG. 25 is a detailed cross section of the device in the safe riding position.

FIG. 26 is a detailed cross section of the safety device in the wheel removal position.

FIG. 27 is a side view showing a traditional dropout which can be used with the above embodiment.

FIGS. 28 through 34 show a fourth preferred embodiment having a dual member safety device with a geared system requiring only the unlocking and the axial pressing of the quick release for wheel removal. The quick release is a single large throw quick release which does not require rotation for wheel removal. FIGS. 28 through 31 are a sequence showing wheel removal.

FIG. 28 is a cross-section showing the quick release locked and the wheel hub in the riding position.

FIG. 29 is a cross-section showing the quick release in the unlocked position but where the hub cannot come off.

FIG. 30 is a cross-section showing the quick release pressed inward causing the safety device and the remote non-rotatable nut each out of their respective dropout recesses.

FIG. 31 is a cross-section showing the wheel hub removed from the dropouts.

FIG. 32 is a side view showing a dropout with a dropout recess slide area for centering the skewer during wheel removal. Also shown is the gear assembly.

FIG. 33 is a detailed cross section of the safety device in the safe riding position.

FIG. 34 is a detailed cross section of the safety device in the wheel removal position.

FIGS. 35 through 40 show a fifth preferred embodiment having a safety device which resides in a recess on the inner side of the dropout and a recess in the wheel hub. Wheel removal requires the unlocking, rotation, and the axial pressing of the quick release. The rotation of the quick release does not rotate the skewer. FIGS. 35 through 39 are a sequence.

FIG. 35 is a cross-section showing the quick release locked and the front wheel hub in the riding position.

FIG. 36 is a cross-section showing the quick release in the unlocked position but where the hub cannot come off.

FIG. 37 is a cross-section showing the quick release having been rotated, increasing the "throw" and unscrewing the skewer in the quick release cam. In this state the hub still can not come off.

FIG. 38 is a cross-section showing the quick release pressed inward causing the safety device and the remote non-rotatable nut each out of their respective dropout recesses.

FIG. 39 is a cross-section showing the wheel hub removed from the dropouts.

FIG. 40 is a side view showing a dropout with an inner and outer recess surfaces and a ramp system which moves both the non-rotating nut and the safety device to one side so that they automatically fall into a fastened position when the wheel is re-installed. Both dropouts are made so that the wheel can be mounted with the quick release on either side of the bicycle.

FIGS. 41 through 45 are a sequence showing wheel removal.

FIG. 41 is a cross-section showing the quick release locked and the front wheel hub in the riding position.

FIG. 42 is a cross-section showing the quick release in the unlocked position but where the hub cannot come off.

FIG. 43 is a cross-section showing the quick release having been rotated, increasing the "throw" and unscrewing the skewer in the quick release cam. In this state the hub still can not come off.

FIG. 44 is a cross-section showing the quick release pressed inward causing the safety device and the remote non-rotatable nut each out of their respective dropout recesses.

FIG. 45 is a cross-section showing the wheel hub removed from the dropouts.

FIG. 46 is a side view showing the split or double sided dropout with a cavity for the safety device and a channel for movement of the safety device during wheel removal.

FIGS. 47 through 50 are a sequence showing a wide throw quick release with a two part cradle where the wheel hub is automatically installed in the fork.

FIG. 47 is a cross-section showing the outer cradle and adjusting nut being spread by the dropout ramps.

FIG. 48 is a cross-section showing the cradle and adjusting nut having been spread by the fork dropout ramps and now located on top of the dropout raised surface.

FIG. 49 is a cross-section showing the cradle and adjusting nut having sprung into the dropout recess thereby automatically engaging the secondary retention system.

FIG. 50 is a cross-section showing the quick release tightened and the assembly in the riding position.

FIG. 51 is an expanded cross-section of the cradle mechanism with the conical spring narrowing outward.

FIG. 52 is similar to FIG. 51 but with the conical spring narrowing inward.

FIG. 53 is the same as FIG. 50 showing the wheel in the riding position.

FIG. 54 is the same as FIG. 49 showing the quick release arm having been flipped over releasing the primary locking but the hub still held in place by the secondary retention system.

FIG. 55 is a cross-section showing the two part cradle squeezed together and the skewer pushed inward for centering so the adjusting nut and cradle can clear the dropout restraining surfaces.

FIG. 56 is a cross-section showing the hub being removed from the dropouts while the two part cradle is still being squeezed together.

FIG. 64 is a partial cross-section of an adjusting nut with plastic cover and locking nut.

FIG. 65 is a partial cross-section of a monolithic material adjusting nut and locking nut.

FIG. 66 is a cross-section of an adjusting nut with a tool tightened counter locking nut.

FIG. 67 is a cross-section of an adjusting nut with a slip fit locking nut and set screw.

FIGS. 71 through 74 show a vehicle roof rack attaching system for bicycles equipped with ramped forks as well as for other bicycles.

FIG. 71 is a side view of a car with a bicycle on the novel bicycle rack.

FIG. 72 is a cross-section through the front fork attaching system showing the quick release in a tightened position and the bicycle ready for transporting.

FIG. 73 is a cross-section through the front fork attaching system showing the quick release flipped over and the bicycle removed.

FIG. 74 is a cross-section showing the holder for the unattached front wheel.

FIGS. 75 through 78 are a sequence showing a wheel fastening system where the quick release is unlocked, then pushed inward in order to release the secondary retention system.

FIG. 75 is a cross-section showing the mechanism in the locked riding position.

FIG. 76 is a cross-section showing the quick release flipped over and unlocked.

FIG. 77 is a cross-section showing the skewer pushed inward raising a portion of the inboard cradle out of the dropout recess and forcing the adjusting nut out of the dropout recess.

FIG. 78 is a cross-section showing the system clearing the dropout while the inner part of the inboard cradle slides along and out of the dropout recess.

FIG. 79 is a detail of the cradle shown in FIG. 75.

FIG. 80 is a detail of the cradle shown in FIGS. 77 and 78.

FIG. 81 is a cross-section showing the mechanism in the locked riding position.

FIG. 82 is a cross-section showing the quick release flipped over and unlocked.

FIG. 83 is a cross-section showing the quick release and skewer pushed inward.

FIG. 84 is a cross-section showing the quick release and skewer turned to raise the outer part of the inboard cradle out of the dropout recess ready for wheel removal. Also shown is an external view of the outer part of the inboard cradle with the lifting cut.

FIG. 85 is a cross-section showing the rotation resistant skewer, axle, outboard cradle, and cam axle.

FIGS. 86 through 88 show a dropout with a non-flat inboard dropout inclined hub mounting bulge.

FIG. 86 is perspective of the inboard side showing the dropout inclined surfaces.

FIG. 87 is a side elevation of the outboard side with standard recess.

FIG. 88 is a side elevation of the inboard side with the dropout inclined surfaces.

FIG. 89 is a cross-section showing the rotation resistant skewer with a turning knob having a back rotation stop catch system.

FIG. 90 is a side view showing the back rotation stop device.

FIG. 91 is a cross-section of a rotation resistant skewer with a turning knob and a rotation resistant device.

FIG. 92 is a bottom view of the turning knob showing the high friction surface.

FIG. 93 is a side view of the dropout showing a position of the spring loaded ball bearing.

FIG. 96 is a side elevation of the brake and secondary retention system with the rim and tire shown in section view, where the assembly is in the riding position.

FIG. 97 is a side elevation of the brake and secondary retention system with the rim and tire shown in section view, with the brake cable release system manually opened and held in the open position.

FIG. 98 is a side elevation of the brake and secondary retention system with the rim and tire shown in section view, with the brake cable release system manually opened and held in the open position to allow the wheel to be removed.

DETAILED DESCRIPTION OF THE INVENTION

Figure 16:
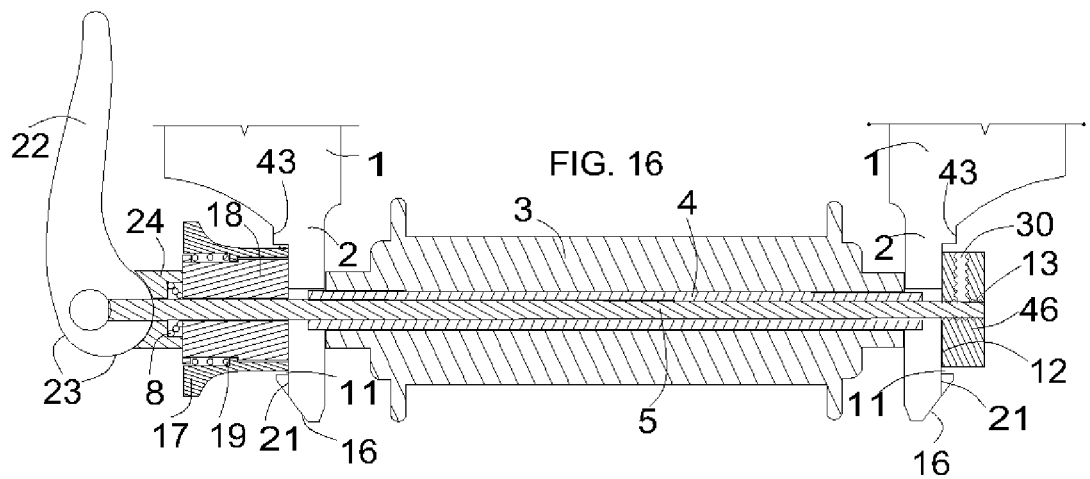
FIGS. 16 through 19 show a modified second preferred embodiment having the same dual member safety device as FIG. 9 but with a single large throw quick release which does not require rotation to increase the spread between the quick release and the nut for wheel removal.
Figure 17:
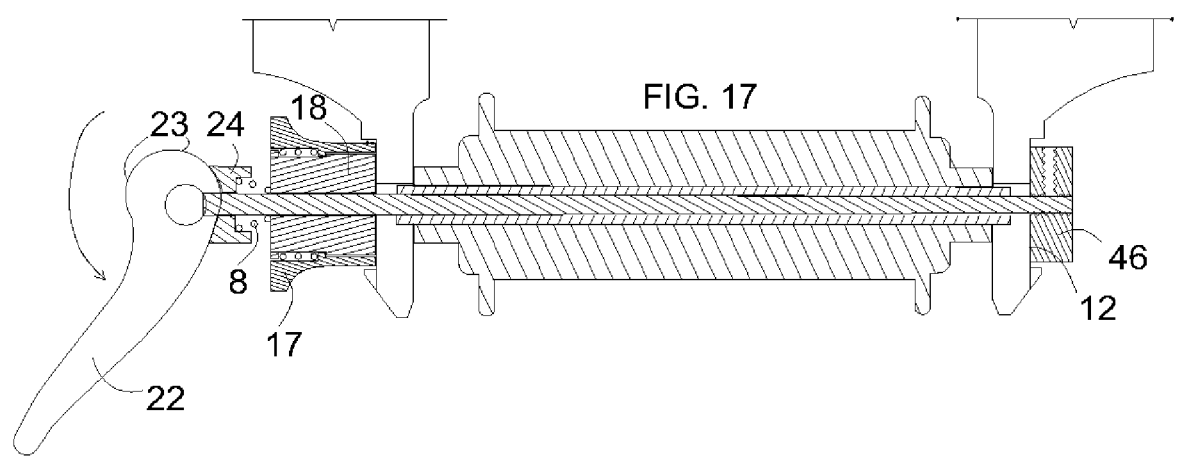

The following is a detailed description of the preferred embodiments of the present invention. It is apparent to those skilled in the art that any number of modifications can be made to the present invention and any such modification shall fall within the present invention even if not specifically shown.

The fundamental underlying principle of the present invention comprises a wheel fork or vehicle frame with two wheel mounts, or dropouts, where each of the dropouts has a recessed surface or retaining tabs, either on its outer face, or its inner face, or both. The quick release wheel has a hollow axle hub and an interior mounted skewer, wherein said skewer has a quick release cam or other fastening device on one end and a nut on the other end and is spring loaded toward the quick release end such that the nut is always urged against and into the adjacent dropout recessed surface to prevent its rotation and exit from the recess. On the quick release end of the skewer, a safety device of some form is also urged by spring into a recess. In this way, neither end is able to exit the dropout unless the quick release end is pushed inward axially allowing the nut to exit its recess area. In some cases, the safety device located on the quick release end of the skewer must be operated separately from the nut, and in some cases, the safety device can be operated in the same motion as the device to allow the wheel to be removed from the dropouts.

FIGS. 1 through 8 show the first preferred embodiment where a quick release lever is unlocked and spun, then it is pushed inward while a safety pull cylinder is pulled outward allowing the wheel to be removed. Referring to FIG. 1, a fork 1 with dropouts 2 holds a standard hub 3, with a hollow axle 4 housing a skewer 5 which has mounted on one end a standard quick release 6 and a standard quick release lever 7 with a standard quick release spring 8, and an adjusting nut 9. This adjusting nut 9 is a "non-touch" nut which, unlike conventional systems, does not require the operator to touch or hold it while spinning the quick release on the opposite end.

On the quick release end of the skewer 5, a novel safety pull cylinder 10, which could take a wide variety of "pullable" round, and non-round configurations, is axially mounted and urged into a dropout recess 11 by the quick release spring 8 which also presses the adjusting nut knarled surface 12 against the opposite dropout recess 11. The combination of the pressure from quick release spring 8 and the adjusting nut knarled surface 12 holds the adjusting nut 9 from spinning relative to dropout 2 when the quick release 6 is spun in order to unscrew the adjusting nut 9 on the skewer threaded area 13. This, unlike the prior art, permits the one sided operation of the present invention. The adjusting nut retaining cap 14 ensures that the adjusting nut 9 does not unscrew off the end of skewer 5. When adjusting nut 9 is unscrewed to a point where it meets adjusting nut retaining cap 14, which freely enters a cavity in the side of adjusting nut 9, it can no longer unscrew and begins to spin with skewer 5, and adjusting nut knurled surface 12 begins to spin relative to dropout recess 11 and dropout 2 and often produces an audible grinding noise and/or a different spinning feeling in quick release 6 indicating to the user that skewer 5 has been sufficiently rotated and no further spinning of skewer 5 is necessary for wheel removal.

FIG. 2 illustrates the unlocking operation of the quick release cam 41. In many cases, this does not offer enough separation between the adjusting nut 9 and the quick release 6, and, if a wide throw quick release is not used, the subsequent rotation of the quick release 6, as shown in FIG. 3, is required in order to further spread the distance between the adjusting nut 9 and the quick release 6 in order to remove the wheel. Rotation of quick release 6 causes spreading until adjusting nut 9 encounters adjusting nut retaining cap 14 or another stopping surface of some kind.

FIG. 4 shows the next step in the wheel removal process where quick release 6 is pushed axially inward while the safety pull cylinder is squeezed against it thus causing the safety pull cylinder 10 to exit the dropout recess 11 and clear dropout restraining surface 44 while the adjusting nut 9 also exits the corresponding dropout recess 11 and also clears dropout restraining surface 44. Dropout restraining surface 44 plays a critical role in preventing the wheel hub assembly from unexpected separation from the fork. Again, dropout restraining surface 44 and dropout raised surface 43 could be on a "tab" rather than the recess side as shown. FIG. 5 is the last of the sequence and shows the skewer 5 having exited through dropout opening 15 and the safety pull cylinder 10 and the adjusting nut 9 having bypassed the dropout raised surface 43. The embodiment can be used with a variety of different dropout configurations. FIG. 6 shows a conventional dropout 2, which can be used where dropout restraining surface 44 is positioned at the lower area of dropout recess 11.

FIG. 7 shows a novel dropout wherein dropout ramps 16 are added on the lower sides of the dropout 2 and where the tip of the dropout is set in a position which optimizes the ease of insertion of the wheel hub into the dropout while being "blunt" enough to avoid being dangerous and avoid poking through a shipping carton. The dropout ramp 16 on the hub/wheel side of the dropout serves to facilitate the centering of the hub as it enters the dropouts. The dropout ramp 16 on the outside non-hub/wheel side of the dropout serves to spread the safety pull cylinder 10 and the adjusting nut 9 apart. The slight angle of the dropout opening 15 also serves to facilitate the centering of the hub as it enters the dropouts as does a taper between opening 15 and dropout ramp 16.

When re-installing the wheel, the process is done in reverse. However, if a ramp 16 is used, FIG. 5 would not require a hand to squeeze quick release 6 against safety pull cylinder 10 as the ramps perform this function. When the wheel is being re-installed on the fork 1, this dropout ramp 16 automatically forces the adjusting nut 9, and the safety pull cylinder 10 to separate, compressing quick release spring 8, and then moving up and over the dropout raised surface 43 and subsequently being pulled into the dropout recess 11 by quick release spring 8. At this point, even though the quick release 6 and adjusting nut 9 have not been manually operated in any way, the wheel cannot be removed from the fork. On conventional bicycles, when the wheel is re-inserted into the dropouts and would appear to be safe to ride, there is nothing to stop it from again inadvertently separating from the fork. This is the safe condition that the present invention offers over conventional technology. A conventional adjusting nut may be used in conjunction with this invention. However, adjusting nut 9, when used with adjusting nut retaining cap 14 is novel in that it does not allow adjusting nut 9 to inadvertently be unscrewed off the end of skewer 5, a common problem on conventional bicycles.

FIG. 8 shows adjusting nut 9 modified to include a rotation limit control cap 48 which, when the skewer 5 as shown in FIG. 3 is rotated in a tightening manner to the position shown in FIG. 2, it is blocked from being further tightened by the rotation limit control cap stopping surface 50, which encounters adjusting nut retaining cap 14. In this configuration, the quick release 6 is set for perfect tightening of the quick release cam 41 using the quick release lever 7 as shown in going from FIG. 2 to FIG. 1. Rotation limit control cap 48 is adjusted relative to adjusting nut 9 by using rotation limit control cap threading 49, which can be on the outside or inside of adjusting nut 9, to achieve the precise setting. When adjusting nut retaining cap 14 encounters rotation limit control cap stopping surface 50, adjusting nut 9 begins to spin with skewer 5, and surface adjusting nut knarled surface 12 begins to spin relative to dropout recess 11 and dropout 2 and often produces an audible grinding noise as well as a different spinning feeling in the quick release 6 indicating to the user that skewer 5 has been sufficiently rotated and the quick release lever 7 is ready for closing.

This novel rotation control system thereby operates without the user touching the adjusting nut 9 and offers pre-set limits on it range of movement providing perfect quick release function for locking the wheel on one end, and perfect outboard setting for clearing dropout raised surface 43 when removing the wheel on the other end. In this way, it is a "smart-no touch" nut which guides the limits of spinning of skewer 5 when both removing the wheel, as well as when re-installing the wheel for proper quick release cam function.

FIG. 9 through FIG. 15 illustrate a second preferred embodiment which functions the same as the embodiment shown in FIGS. 1 through 8, except is equipped with a centering mechanism for easier wheel removal. This variation uses a two part safety device instead of the safety pull cylinder 10 shown in FIGS. 1 through 8. FIGS. 9 through 13 illustrate the sequence of removal of the wheel with this embodiment where the safety system allows the inner centering cylinder 18 to always be in contact with dropout 2 while the quick release head 6 is released, rotated, and pushed in thereby centering the mechanism for easier removal. The outer safety pull cylinder 17 must be squeezed simultaneously and opposite to the pushing of quick release head 6 in order for wheel removal. Inner centering cylinder 18 then slides along dropout recess 11 and into dropout recess slide 21 escaping from the wheel dropouts 2 as shown in FIG. 13. Outer safety pull cylinder 17 is too large to fit through dropout recess slide 21 while inner centering cylinder 18 is not. The safety cylinder inner spring 19, held by centering cylinder assembly ring 20, is used to ensure that outer safety pull cylinder 17 remains locked inward and against dropout restraining surface 44.

When re-installing the wheel, the operation is done in reverse, however the squeezing shown in FIG. 13 is not required.

Figure 18:
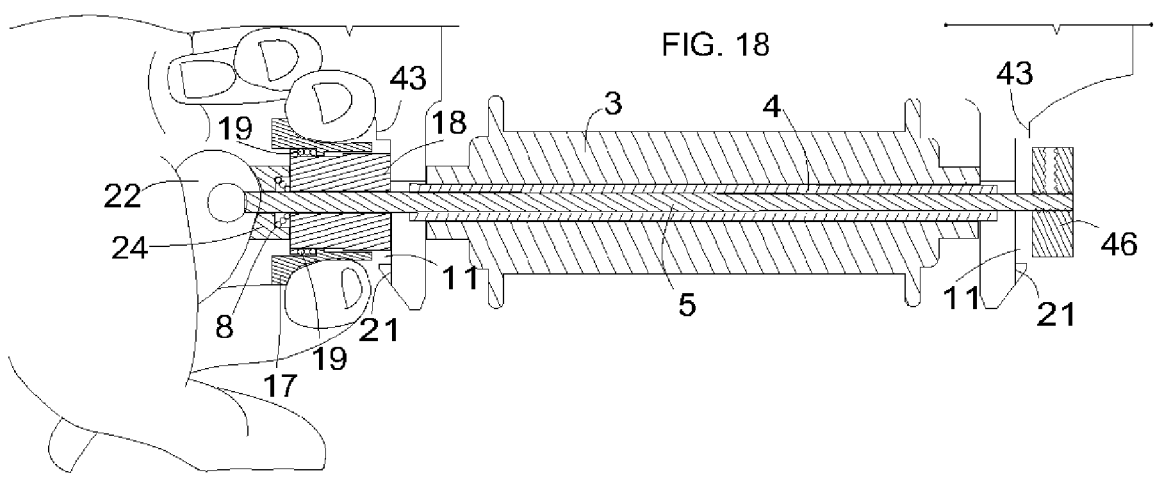
Figure 19:
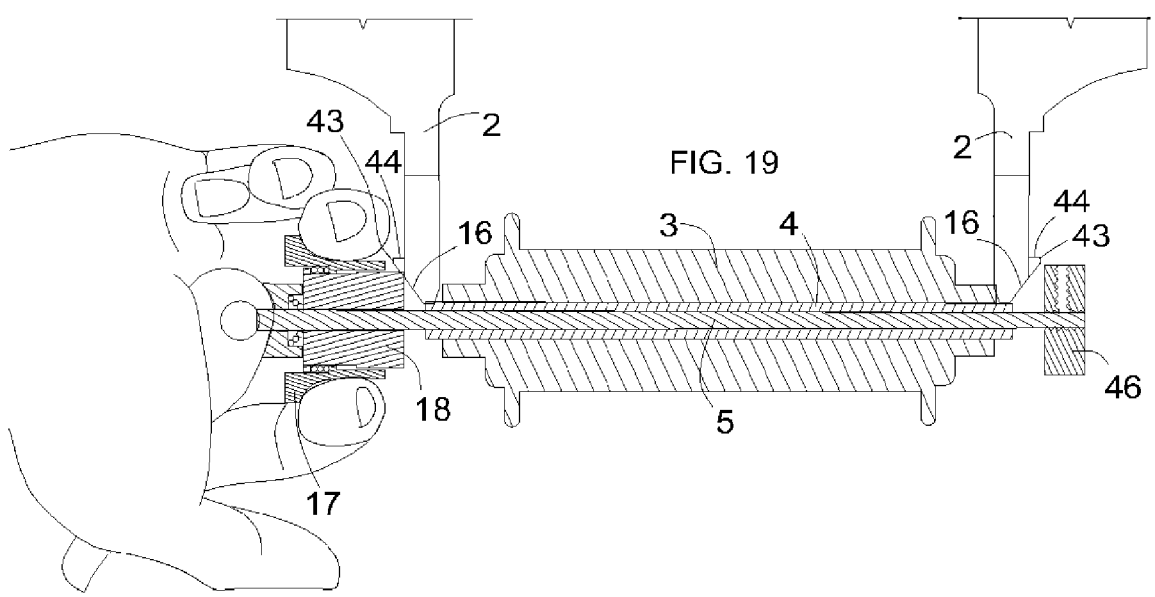
Figure 20:
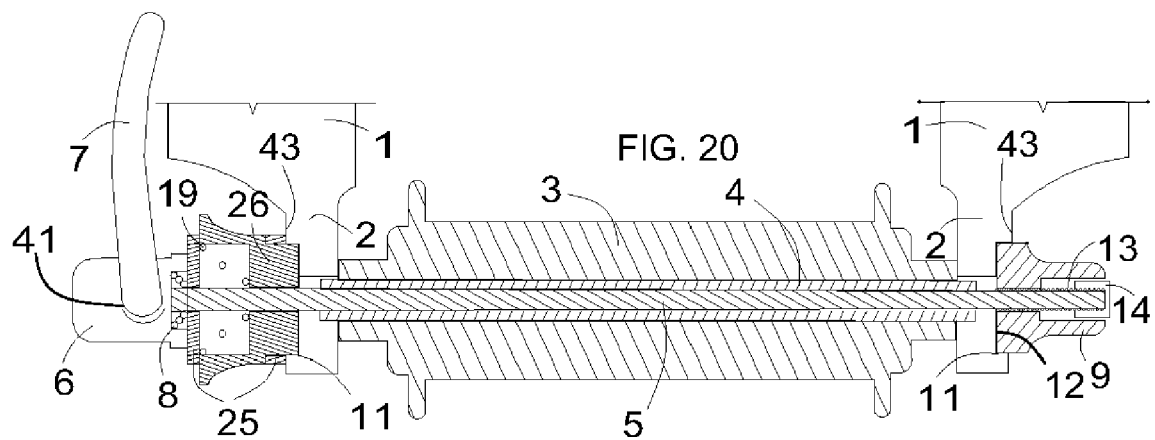
Figure 21:
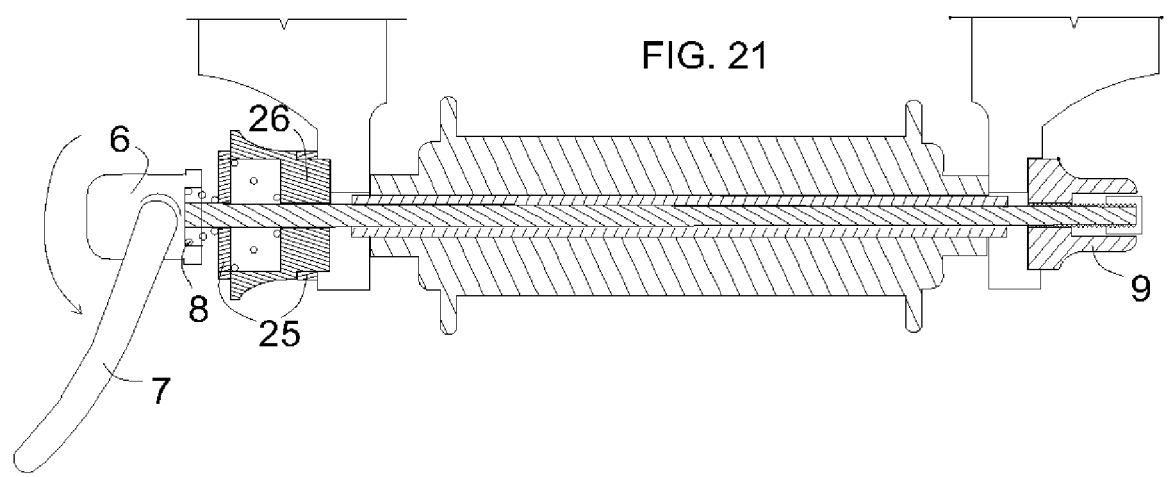
Figure 22:
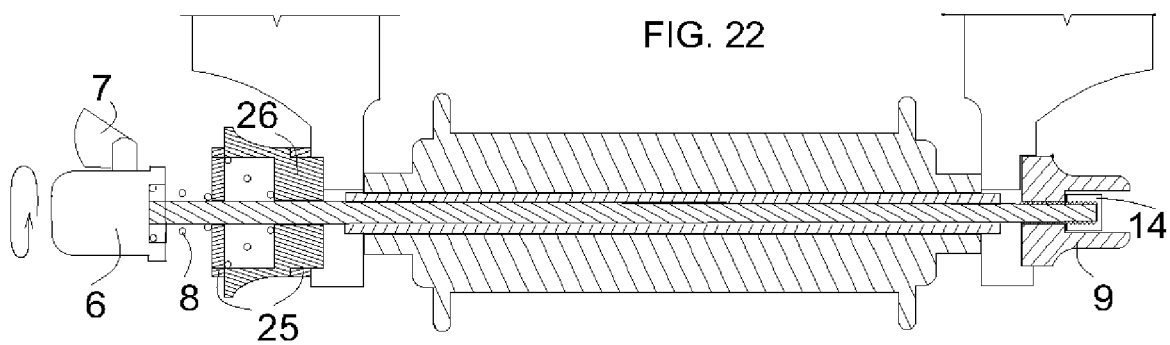
Figure 30:
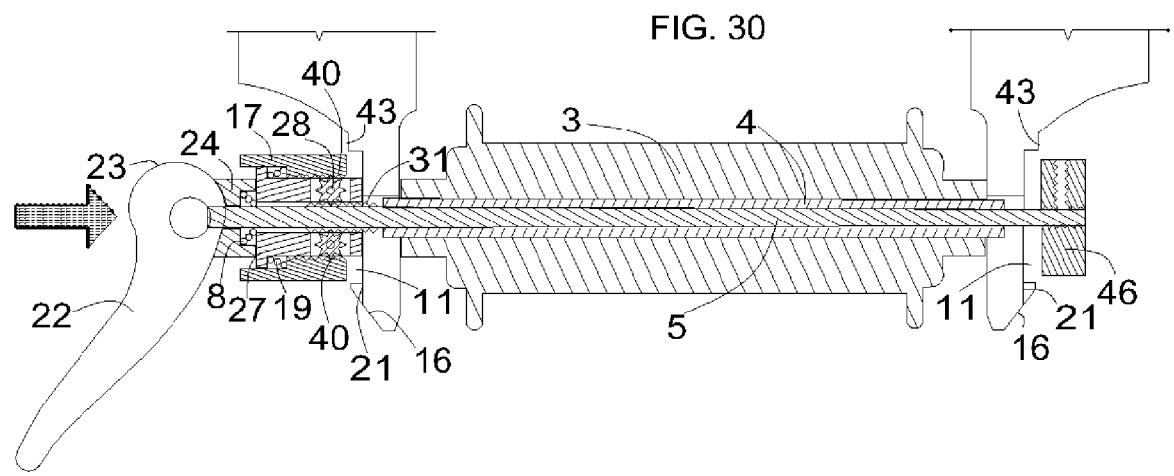

The sequence shown in FIGS. 16 through 19 illustrates a modification of the second preferred embodiment of FIGS. 9 through 15, however, a non-rotatable adjusting nut 46, combined with adjusting nut set screw 30, and a wide throw quick release integral cam arm 22 avoids the need for the spinning of the quick release and skewer as shown in FIG. 11. Surface 23, which rides on quick release cradle 24, varies in distance from the cam center enough such that when quick release integral cam arm 22 goes from FIG. 16 to FIG. 17, it allows non-rotatable adjusting nut 46 to clear dropout restraining surface 44 when skewer 5 is pushed inward axially, as shown in FIG. 18. As in previous figures, outer safety pull 17 must also be squeezed in order to allow for wheel removal as shown in FIG. 19. A standard bicycle nut could be used on this embodiment to replace non-rotatable adjusting nut 46.

When re-installing the wheel, the operation is done in reverse, however the squeezing shown in FIG. 19 is not required.

FIGS. 20 through 27 illustrate a third preferred embodiment which is a variation of FIG. 9 where the safety mechanism is operated in the same manner, but functions slightly differently. The slotted outer centering cylinder 25 transfers the quick release 6 pressure onto the dropout raised surface 43, and the inner safety pull cylinder 26 resides in the dropout recess 11, but has two pull areas, or finger holds, extending outside the slotted outer centering cylinder 25 which must be squeezed outward simultaneously to depressing of quick release head 6 for wheel removal. Once again, safety cylinder inner spring 19 ensures that inner safety pull cylinder 26 is always being pushed into dropout recess 11 and quick release spring 8 ensures that adjusting nut 9 is always being pulled into the opposite dropout recess 11 as well. The advantage of this variation over the variation shown in FIG. 9 is that it can use a standard dropout as shown in FIG. 27. When re-installing the wheel, the process is done in reverse.

All systems shown in FIGS. 1 through 27 require that the user, at a minimum, pushes and squeezes the quick release and safety device together. In some cases, it may be desirable to simply push the quick release with no squeezing action required. FIGS. 28 through 46 show systems where the squeezing action is not required.

Figure 31:
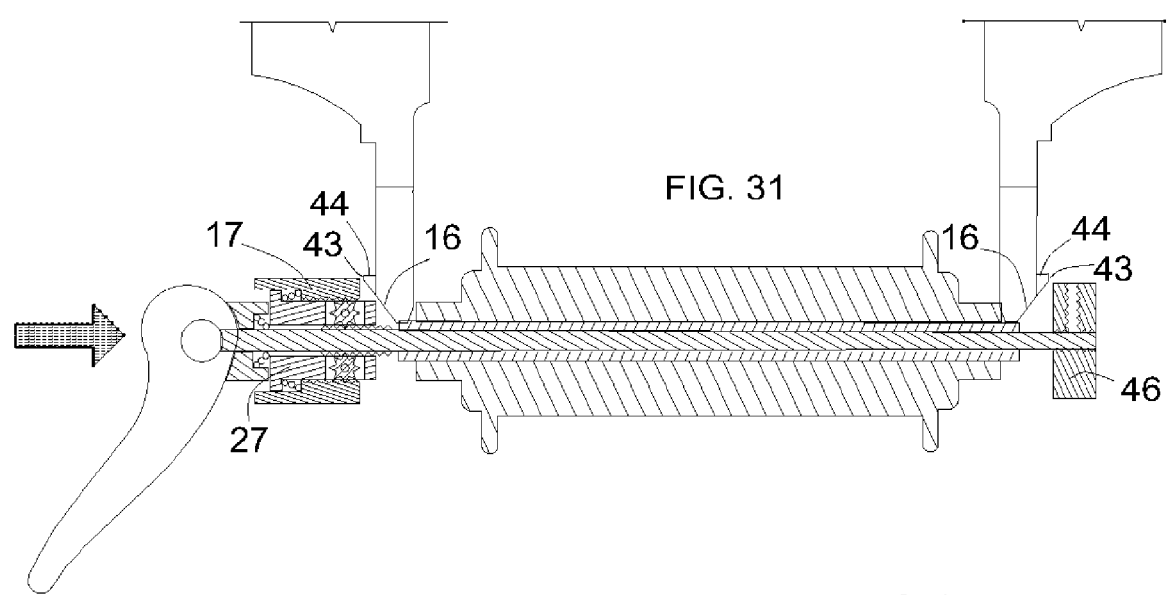
Figure 33:
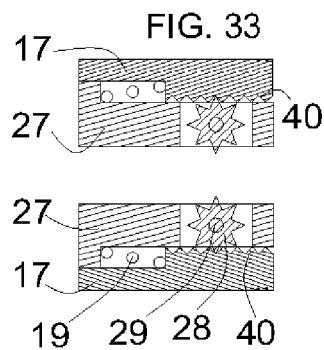
Figure 34:
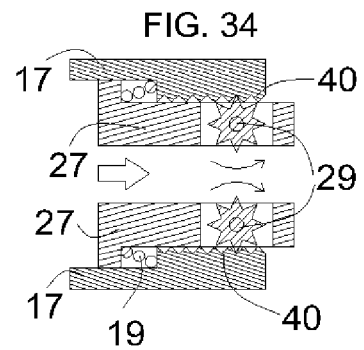

FIGS. 28 through 34 illustrate a fourth preferred embodiment in a system where inner centering cylinder with ring gear 27 is equipped with ring gear 28, and is mounted on ring gear axle 29. As the quick release integral cam arm is opened and pushed, skewer gear teeth 31, force ring gears 28 to rotate, which contacts outer safety cylinder ladder gear 40, attached to outer safety pull cylinder 17, forcing it out of dropout recess 11. In this way, the single action of pushing the quick release integral cam arm 22 and skewer 5 inward causes both the outer safety pull cylinder 17 and non-rotatable adjusting nut 46 to exit dropout recess 11 and allow the wheel to be removed. When re-installing the wheel, the operation is done in reverse, however the pushing arrow shown in FIG. 31 is not needed.

FIGS. 35 through 40 illustrate a fifth preferred embodiment which uses the same principle of pushing the quick release inward in order to release both sides of the wheel for wheel removal. However, the mechanism of FIGS. 35 through 40 has several unique concepts. The dropout 2 is equipped with dropout inner recess 36 on its inner surface as well as dropout recess 11 on its outer surface. Axle 4 does not extend into the dropout 2 on the quick release side due to a hub safety disc recess 33 which houses a safety disc 34, and a safety disc spring 35. Therefore the load bearing skewer 32 must take the vehicle load when quick release adjustable cam arm 38 is not locked. The quick release adjustable cam arm 38 rotates like previous embodiments, however, when rotated, it does not rotate load bearing skewer 32, but instead causes the adjustable cam 45 to thread up and down skewer adjustable cam threaded area 37 and is restrained from coming off the end by adjustable cam retaining nut 39. Quick release spread disc 42, which could be combined with quick release cradle 24, allows the two to avoid falling into dropout recess 11 which is sized for wheel reversibility. Safety disc 34 and non-rotatable adjusting nut 46 always remain a set distance apart, and when load bearing skewer 32 is pushed, move in unison to both exit their respective recess areas. Safety disc spring 35 and quick release spring 8 ensure that safety disc 34 and non-rotatable adjusting nut 46 remain in recess slots for safety at all times.

Figure 35:
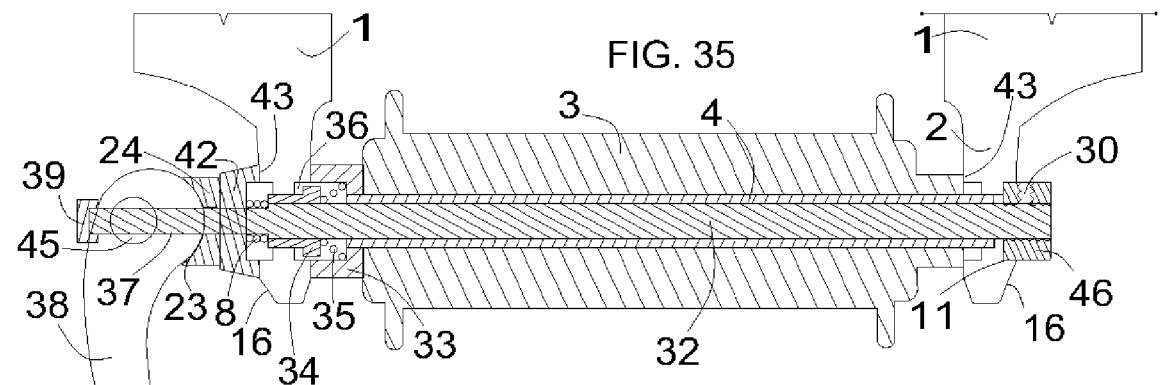
Figure 36:
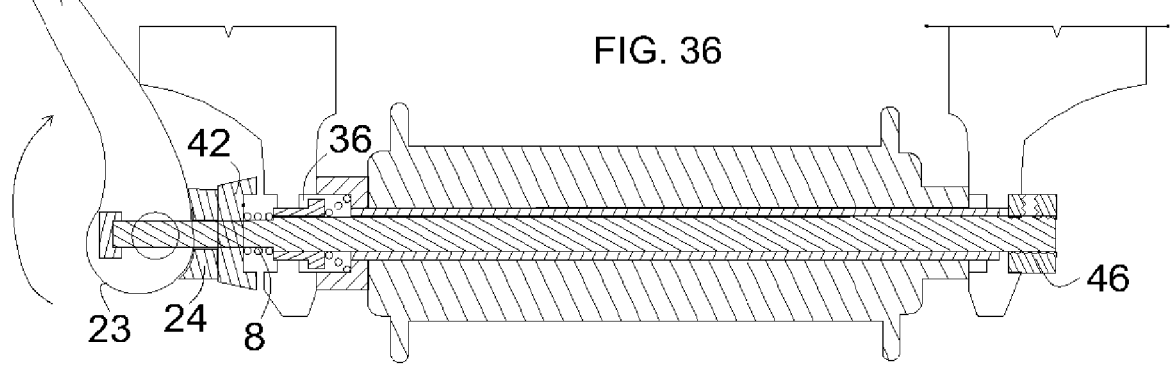
Figure 37:
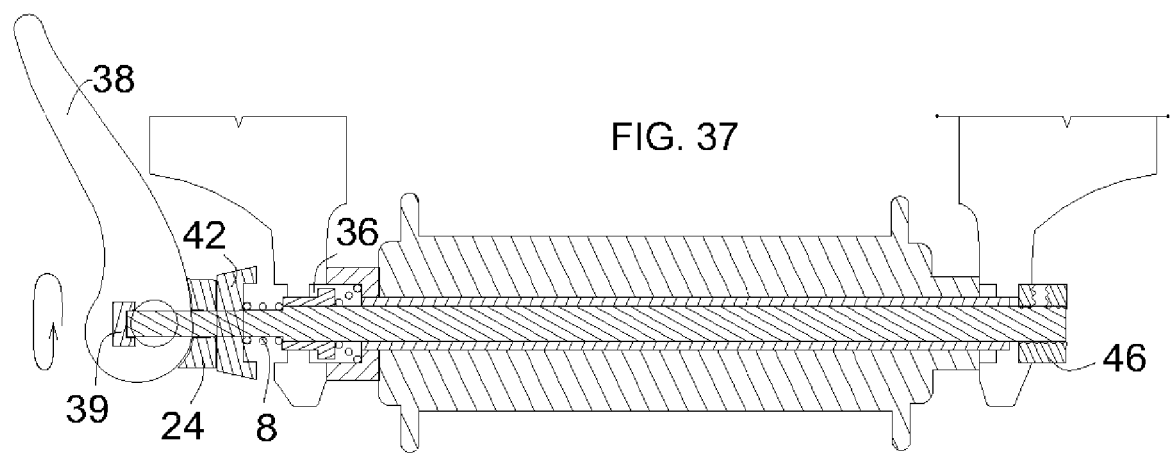
Figure 41:
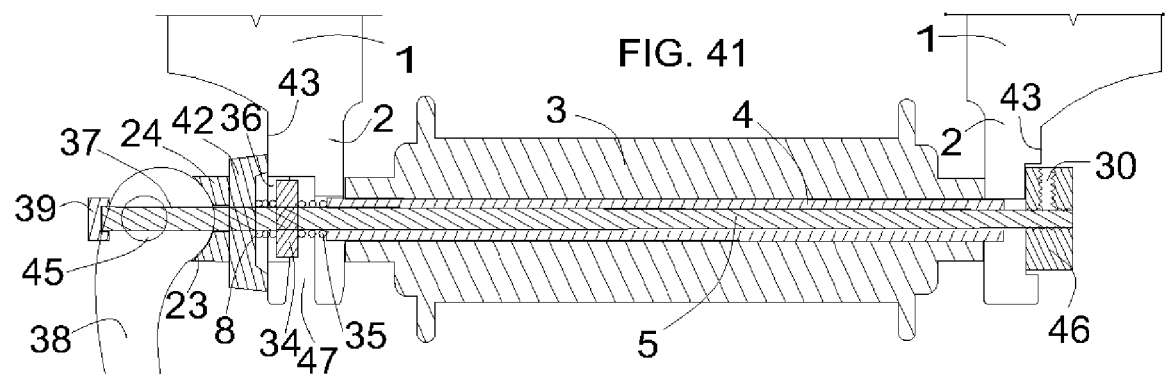
FIGS. 41 through 46 show a sixth preferred embodiment having a safety device which resides in a recess in a split, or double dropout. Wheel removal requires the unlocking, rotation, and the axial pressing of the quick release. The rotation of the quick release does not rotate the skewer.
Figure 42:
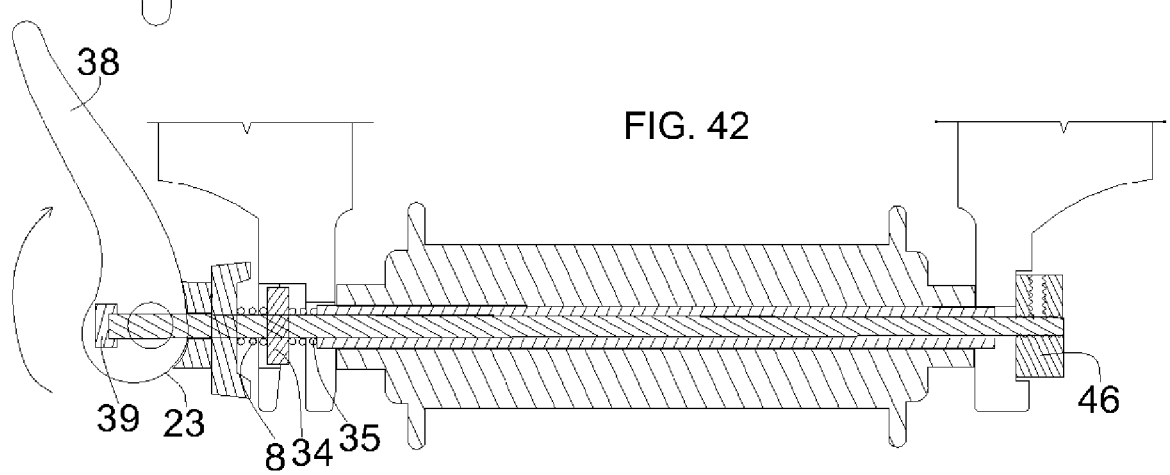
Figure 43:
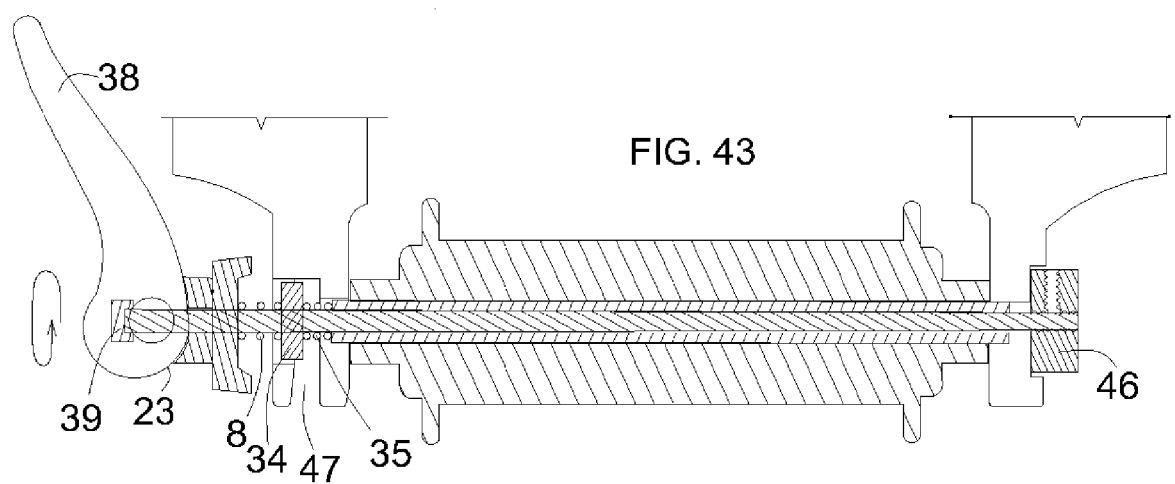
Figure 44:
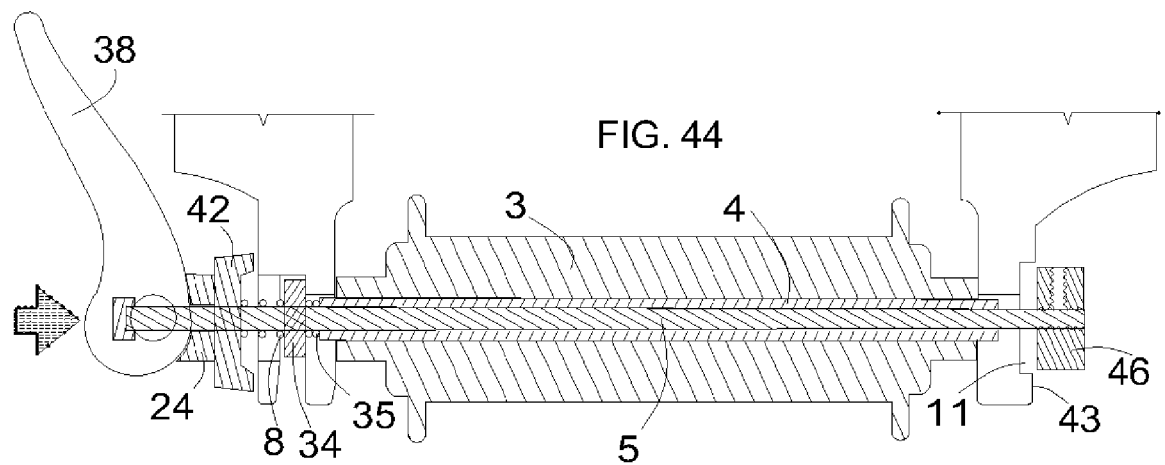
Figure 45:
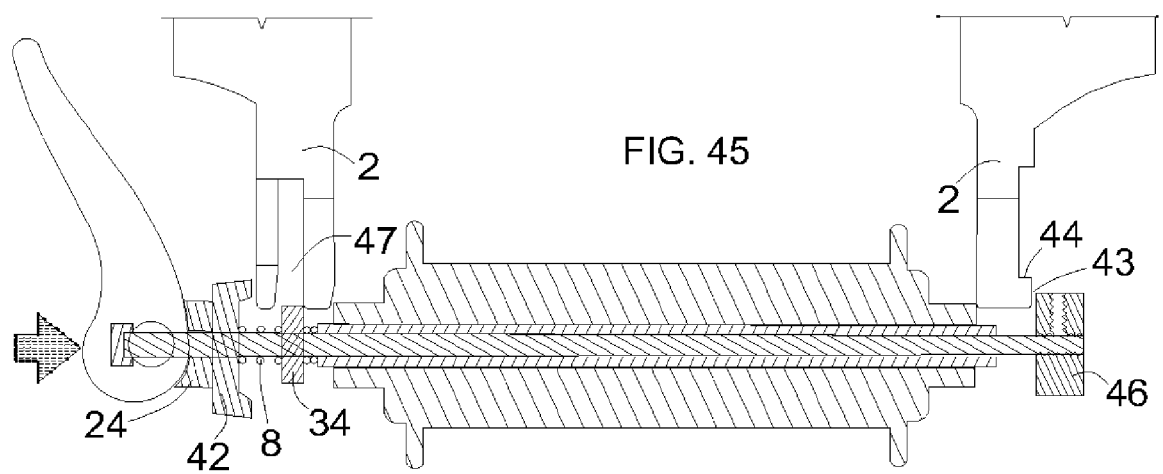
Figure 46:
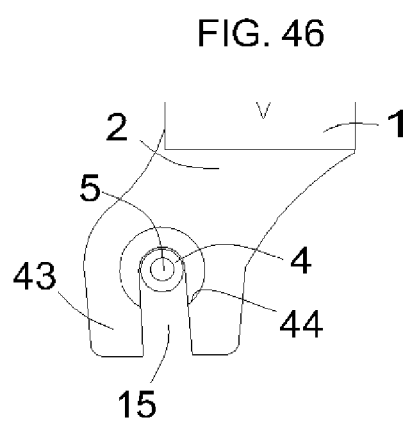

FIGS. 41 through 46 illustrate a sixth preferred embodiment which uses the same principle of pushing the quick release inward in order to release both sides of the wheel for wheel removal. However, unlike all previous preferred embodiments, here the two dropouts 2 are not mirror images of one another and the wheel sides are not reversible. The quick release side dropout 2 has a split dropout safety disc opening 47 which allows safety disc 34, when skewer 5 and adjustable cam 45 are pushed axially inward, to exit dropout inner recess 36 and enter split dropout safety disc opening 47 and clear the dropout for wheel removal. Safety disc 34 and non-rotatable adjusting nut 46 always remain a fixed distance apart. Quick release adjustable cam arm 38 and adjustable cam 45 again, when rotated, do not cause the rotation of skewer 5, but rather thread up and down skewer adjustable cam threaded area 37. The advantage of this embodiment over FIG. 35, is that it uses a standard hub 3, and standard axle 4 diameter.

All the above variations are interchangeable. Each can be used with a wide throw quick release integral cam arm 22 which can avoid the need for further rotation or spinning after operation of the cam. This allows for the use of a non-rotatable adjusting nut 46 or a conventional bicycle nut. Likewise, all variations can use a small throw quick release 6 which requires further rotation or spinning in order to spread the distance between the quick release and the nut for wheel removal. With the exception of FIGS. 35 through 46, all variations can use the adjusting nut with a rotation limit control cap as shown in FIG. 8 for fast adjustment of quick release arm operation.

Figure 98:
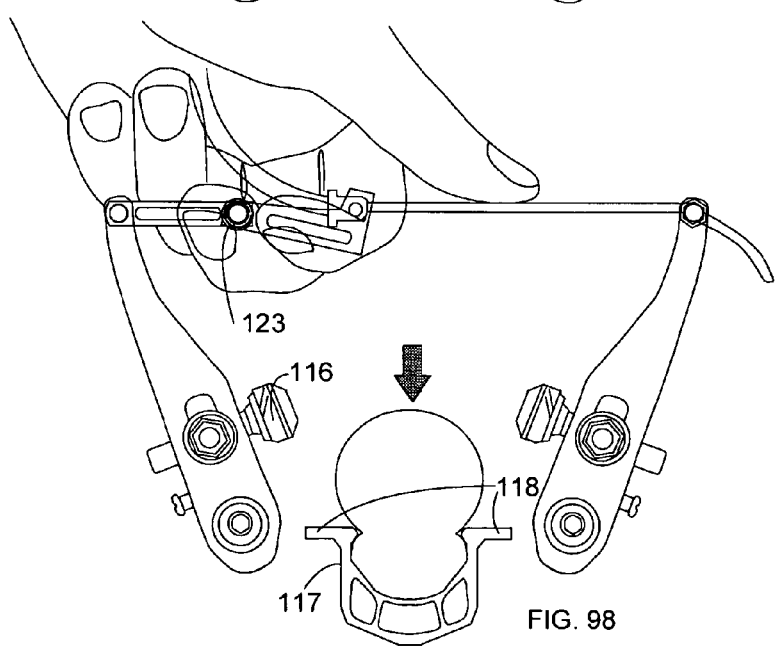

Referring now to FIGS. 47-98, additional preferred embodiments of this invention are disclosed.

In some cases it has been found that the general bicycle user population has difficulty understanding the method of properly adjusting the tension for correct quick release cam operation. The method of turning an adjusting nut on the opposite side from a quick release to a position where, when the cam is operated in a "flip-over-the-top" method, it is correctly fastened, may be difficult to understand. The general user population can understand simply turning a knob until it is tight, or on a separate assembly they understand simply operating a "flip-over-the-top" lever. When the two are combined however, as is the case on present day quick release systems, the general user population often does not do it correctly and is known to use a quick release lever like a "wing nut" by rotationally tightening it as far as possible, and ignoring the "flip-over-the-top" motion required for correct function. This produces a situation where the wheel seems to be adequately tight, but in fact is not.

Therefore it is desirable to have a system where the wheel is securely fastened by simply operating a cam lever in a "flip-over-the-top" manner. Alternatively, it is desirable to have a system where the wheel is securely fastened by simply turning a knob until tight. Furthermore, in the event of user error on even these simple systems, and to ensure safety, both systems should have a secondary retention system which is either automatically engaged, or forces the user to manually engage it. Therefore, the wheel fastening systems shown in FIGS. 47 through 84 and FIGS. 96 through 98 meet the following criteria:

[a]. Bicycles equipped with a manually operated primary wheel fastening mechanism shall also be equipped with a secondary wheel retention mechanism which only allows the wheel to be removed from the bicycle when, after releasing the primary wheel fastening mechanism, the secondary wheel retention mechanism is held manually disengaged at the point when the wheel hub exits the fork dropouts.

[b]. Insertion of the wheel hub in the dropouts shall require that the primary wheel fastening or the secondary wheel retention mechanism either automatically fasten the wheel at the point when the wheel hub enters the fork dropouts or shall require the manual fastening of the wheel with the primary fastening or the secondary wheel retention system at the point when the wheel hub enters the fork dropouts.

[c]. During all states of fastening and unfastening of the primary fastening mechanism, the secondary wheel retention mechanism, in a hands-off condition, shall not allow the wheel hub to be separated from the fork.

FIGS. 47 through 56 illustrate a seventh preferred embodiment which incorporates a beveled wide throw quick release lever which only requires "flip-over-the-top" operation with no rotation, and a separating cradle. This wide throw quick release has cam variation, or "throw" which is at least as large as the combined height of the two dropout Restraining surfaces 44. FIGS. 47 through 50 show a sequence where the wheel assembly is inserted into the fork assembly. FIGS. 53 through 56 show a sequence where the wheel assembly is being removed from the fork assembly. Referring to FIG. 47, the wheel assembly is just beginning to be inserted into the fork dropouts with outboard cradle 52 being separated from inboard cradle 54 by cradle spring 53 thereby pushing malleable cradle insert 59 against beveled quick release variable edge 55. Lockable adjusting nut 58 has been previously counter-locked against counter locking nut with nylock 56 in a position for correct quick release cam tension. In first time assembly, the wheel is inserted into the fork and lockable adjusting nut 58 is threaded on to skewer 5 to a position which is exactly correct for proper quick release operation. Then counter locking nut with nylock 56 is tool threaded onto skewer 5, and while lockable adjusting nut 58 is held from rotation, counter locking nut with nylock 56 is counter threaded tightly against it at which point neither can be rotated about skewer 5 by hand. Nylock 57 insures the assembly will not vibrate loose or off the end of skewer 5.

As the wheel assembly is inserted (moving from FIG. 47 to FIG. 48), hub 3 is centered by inner hub centering ramp 66 as inboard cradle 54 and lockable adjusting nut 58 are ramped outward by dropout ramps 16. FIG. 48 shows there is enough room between the members of the separating cradle to allow inboard cradle 54 and lockable adjusting nut 58 to clear dropout raised surface 43. Also shown in FIG. 48 is that the separating cradle and inner cradle Spring 53 do not necessarily become fully compressed, as all that is required for the wheel to be installed is that inboard cradle 54 and lockable adjusting nut 58 raise up to and slide along dropout raised surface 43. In the case where dropout ramp 16 is not used, FIG. 48 would be replaced by FIG. 55 and manually operated in this sequence.

FIG. 49 shows inboard cradle 54 and lockable adjusting nut 58 having snapped into dropout recess 11 thereby engaging the secondary retention device. As illustrated, the dropout recess 11 on both forks 1 is configured to retain the cradles 52 and 54 in place. At this point, even though the primary retention device, variable cam body 82 and quick release integral cam arm 22 has not been locked, the wheel cannot inadvertently separate from the fork. Thus, the operator has inserted the wheel into the fork, but has not touched the quick release or hub area at all, and yet, the secondary has automatically engaged for safety. When a stronger spring is used, an audible "click" will be emitted and such alerts the user that the secondary restraining system has automatically engaged.

FIG. 50 shows the quick release integral cam arm 22 having been operated in a "flip-over-the-top" manner and the primary locking system fully engaged and the separating cradle having been compressed together. No spinning of the quick release or adjusting nut is required.

FIG. 51 is an expanded view of the separating cradle with the conical cradle spring 53 having its wide end toward inboard cradle 54. FIG. 52 is an expanded view of the separating cradle with the conical cradle spring 53 having its wide end toward outboard cradle 52. As illustrated in FIGS. 51 and 52, the cradle 54 has a tactile pulling area 200.

Figure 53:
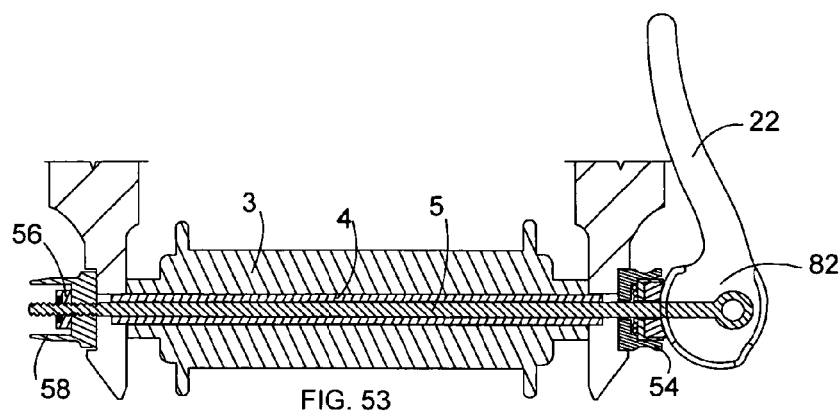
FIGS. 53 through 56 illustrate a sequence showing wheel removal of the same wide throw quick release system found in FIGS. 47 through 50.
Figure 54:
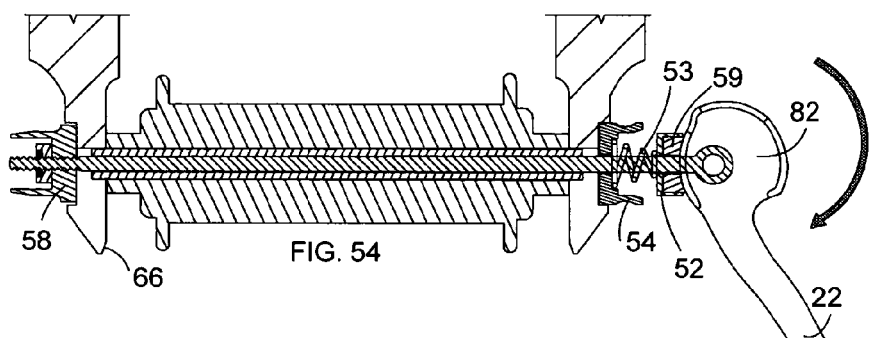

FIGS. 53 through 56 are a sequence of illustrations showing the procedure of unlocking and removing the wheel from the fork. FIG. 53 shows the locked riding position. FIG. 54 shows the quick release lever having been unlocked. In this state, the primary locking device has been disengaged, while the secondary restraining device remains engaged. Outboard cradle 52 and malleable cradle insert 59 always remain engaged or close to the variable cam body 82 when variable cam body 82 and quick release integral cam arm 22 are operated in a "flip-over-the-top" method to release the cam primary locking system.

Figure 55:
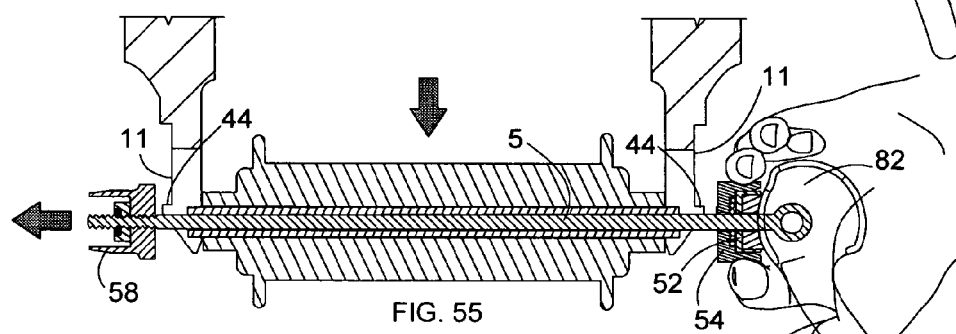

FIG. 55 shows the inboard cradle 54 being manually squeezed together against outboard cradle 52 and variable cam body 82 thereby pushing skewer 5 toward lockable adjusting nut 58 allowing inboard cradle 54 and lockable adjusting nut 58 to exit dropout recesses 11 clearing dropout restraining surface 44. In other words, variable cam body 82 is pushed simultaneously with inboard cradle 54 being pulled and both are held such that the assembly is centered for wheel removal. In this way, the secondary restraining system is held manually disengaged while the wheel is removed from the fork.

Thus, if the secondary restraining system is not held disengaged, then the wheel cannot be removed. Simply operating the secondary once, then letting go, will not allow the wheel to be removed. In this way, disengaging the secondary, then forgetting that it has been disengaged, is not possible.

This operation is done from the quick release side of the bike only and no operation is necessary on the lockable adjusting nut 58 side of the bicycle.

Figure 56:
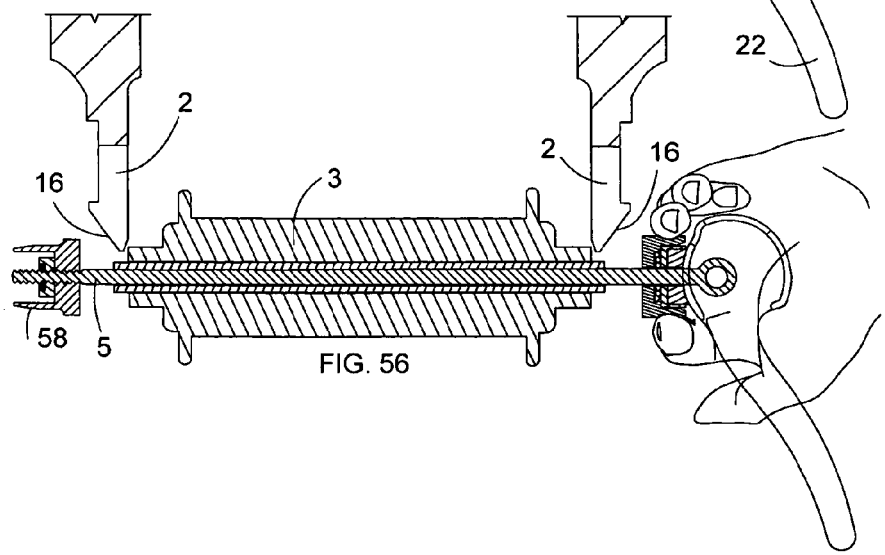

FIG. 56 shows the final state of the sequence where the wheel has been removed from the fork. At this point, the secondary retention system no longer needs to be held open. The lockable adjusting nut 58 is novel in that it offers a cavity which houses a skewer 5 which may vary in length and, if too long, could cut the riders leg if left protruding. In this way, lockable adjusting nut 58 allows skewer 5 to be left long (it is not safe for obvious reasons if skewer 5 if cut too short) without risk to the rider. Not shown is the system being used with a fork that does not have a ramp or ramps for automatic locking of the secondary retention. In this case, the system must be manually separated in order to install the wheel, and the sequence of installing the wheel is simply the reverse of the sequence shown in FIGS. 53 through 56.

It will be obvious to those skilled in the trade that there are a wide number of variations within the scope of this invention. These include but are not limited to making the inboard cradle a simple flat washer with no finger recesses, or a wide variety of other shapes; using a standard adjusting nut with an anti-vibration nylon insert, or a monolithic end of the skewer, or any other adjustable or fixed nut; using various other shapes of springs; and using different shapes, or styles of quick release heads (as long as they offer enough "throw" to allow both sides to clear the recesses). Furthermore the system shown can be used on a front or rear wheel. Also not shown is the use of the two part separating cradle (52 and 54) and a narrow throw standard quick release with a rotation based system as shown in FIG. 1.

Standard quick releases with "half-pipe" cradles used on most bicycle today which must be re-adjusted by rotation each time they are used, have a problem wherein the quick release cradle can sometimes rotate a variable amount relative to the quick release lever/cam causing mis-alignment between the quick release cam varying surface and the cradle. This problem is often corrected by the user by either rotating the cradle back to the correct position, or by loosening the adjusting nut to allow for the extra space required for the non-conforming fit.

When considering the use of a wide throw quick release cam which has cam variation, or "throw" which is at least as large as the dropout restraining surface 44, this problem is amplified for several reasons. First, the wide throw quick release is pre-set for correct cam operation only once, and locked at a specific adjustment, and often is no longer manually adjustable, so it is essential that the cradle to quick release cam relationship does not change dimensionally. If a "half pipe" cradle rotates relative to this wide throw cam, the cam generally crushes the sides of the "half pipe" and cause the overall dimension to change—which may no longer be adjustable. Second, the wide throw cam and cradle are "flatter" than a conventional quick release of smaller variable cam diameter thereby making is easier for unwanted relative rotation.

Figure 57:
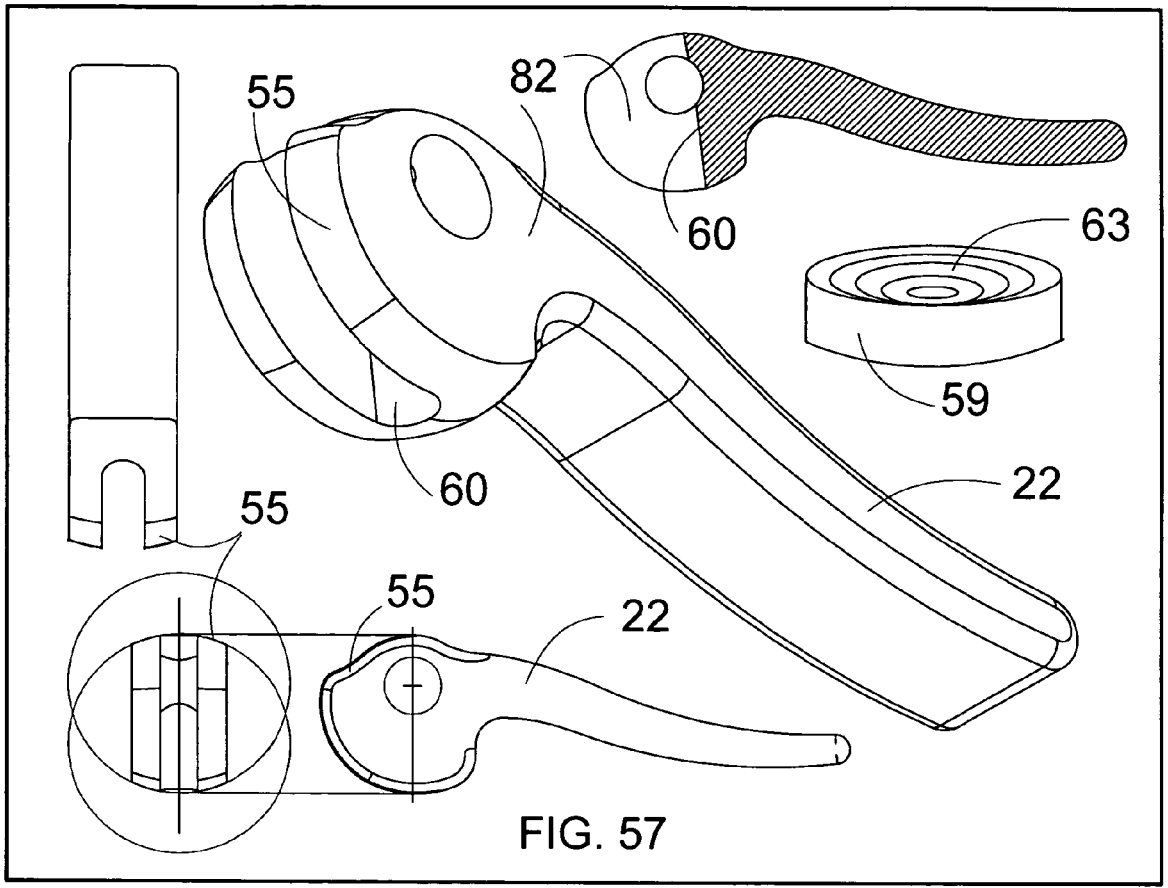
FIG. 57 shows the top, the end, the side, and a perspective view of the beveled edge, wide throw quick release. Also shown is the "bowl" shaped cradle surface.

FIG. 57 illustrates a preferred embodiment of a wide throw quick release head, lever, and cradle which alleviates this problem. The beveled edge 55 variable cam body 82 allows the compatible malleable cradle insert 59 with a bowl shaped cradle surface 63 to rotate any number of degrees relative to one another with no problem. At any relative rotational angle, beveled quick release variable edge 55 and bowl shaped cradle surface 63 maintain the same adjustment with a wide pressure contact surface with each other thereby allowing the primary locking system to function properly with no re-adjustment necessary even if the cradle rotates.

Figure 58:
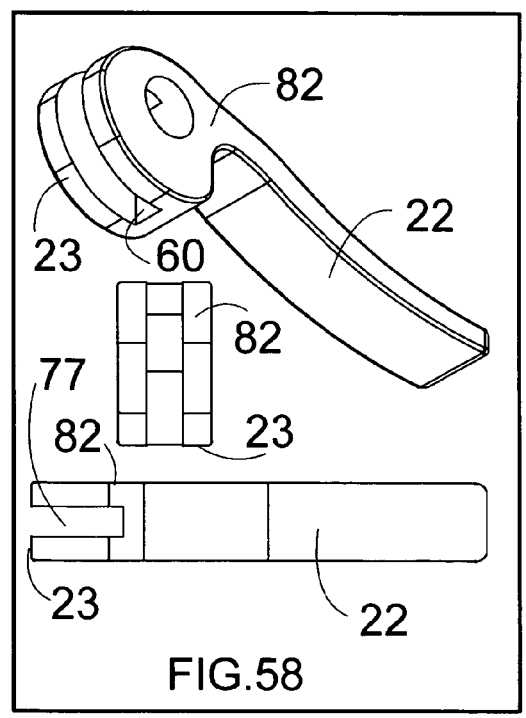
FIG. 58 shows the end view, top view and a perspective of a flat edge, wide throw quick release which uses a "half pipe" cradle.

FIG. 58 shows a non-beveled wide throw quick release with a quick release variable Edge 23 that would be used with a malleable cradle insert 59 with a half pipe cradle surface 64 to form a wide pressure contact surface between quick release variable edge 23 and half pipe cradle surface 64. This non-beveled quick release variable edge 23 cannot be used with a non-aligning bowl shaped cradle surface 63 or a non-aligning flat surface (not shown). In both cases, spot loads or line loads would be created which would not allow the quick release cam to apply sufficient pressure for wheel locking. This wide throw lever can be used with the systems shown in FIGS. 59 through 61. All embodiments shown herein can be used with either beveled or flat, or side throw quick releases.

Figure 59:
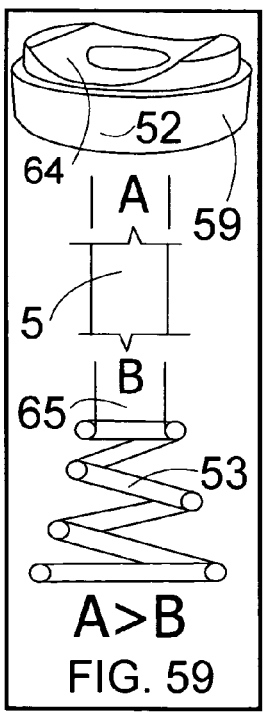
FIG. 59 shows the standard "half pipe" cradle, a movement resistant spring, and a section of the skewer.

FIG. 59 shows a system using a malleable cradle insert 59 with a half pipe cradle surface 64 and a inner cradle spring 53 with a position maintaining spring diameter 65 "B" which is smaller than the skewer 5, having a diameter "A". This way, the small end of the conical Inner cradle spring 53 does not slide easily along the skewer 5 and therefore applies a constant pressure against outboard cradle 52 causing it to stay pushed against quick release variable edge 23 while the quick release is operated in a "flip-over-the-top" manner. In this way, relative rotation between outboard cradle 52 and variable cam body 82 is discouraged.

Figure 60:
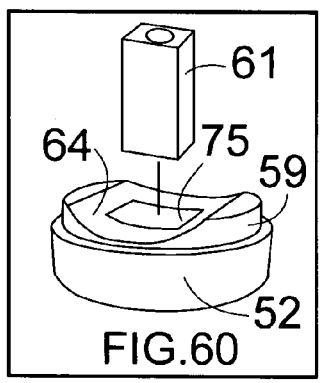
FIG. 60 is a perspective showing a non-rotational cradle.
Figure 61:
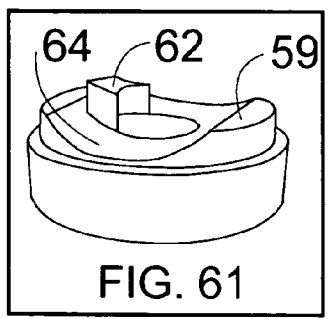
FIG. 61 is another perspective showing a non-rotational cradle.

FIG. 60 shows a skewer mounted outer cradle rotation preventer 61 which fits into outer cradle rotation preventing hole 75 and into quick release slot 77 thereby not allowing relative rotation between outboard cradle 52 and variable cam body 82. FIG. 61 shows a half pipe cradle surface 64 with a integrated outer cradle rotation preventer 62 which can be positioned as shown to prevent unintentional rotation between variable cam body 82 and outboard cradle 52. quick release inner slot edge 60 is modified to account for the additional area occupied by integrated outer cradle rotation preventer 62.

These preferred embodiments can be made with either the flip-over-the-top wide throw quick releases or side arm quick releases made larger and adapted for wide throw applications. This known side arm, wide throw technology, must also have a "throw" at least as large as the combined height of the two dropout restraining surfaces 44. In later single action embodiments, the "throw" can be reduced in height to just over the height of one dropout restraining surface 44. When the wide throw side arm quick release is used in the preferred embodiment, the quick release outer cover can be housed partially within the inboard cradle 54. This preferred embodiment can be made to either engage the secondary retention automatically or require the manual engagement of the secondary retention during wheel insertion. If an automatic system is called for, a ramped dropout system as shown in FIGS. 62 and 63 is used.

Figure 62:
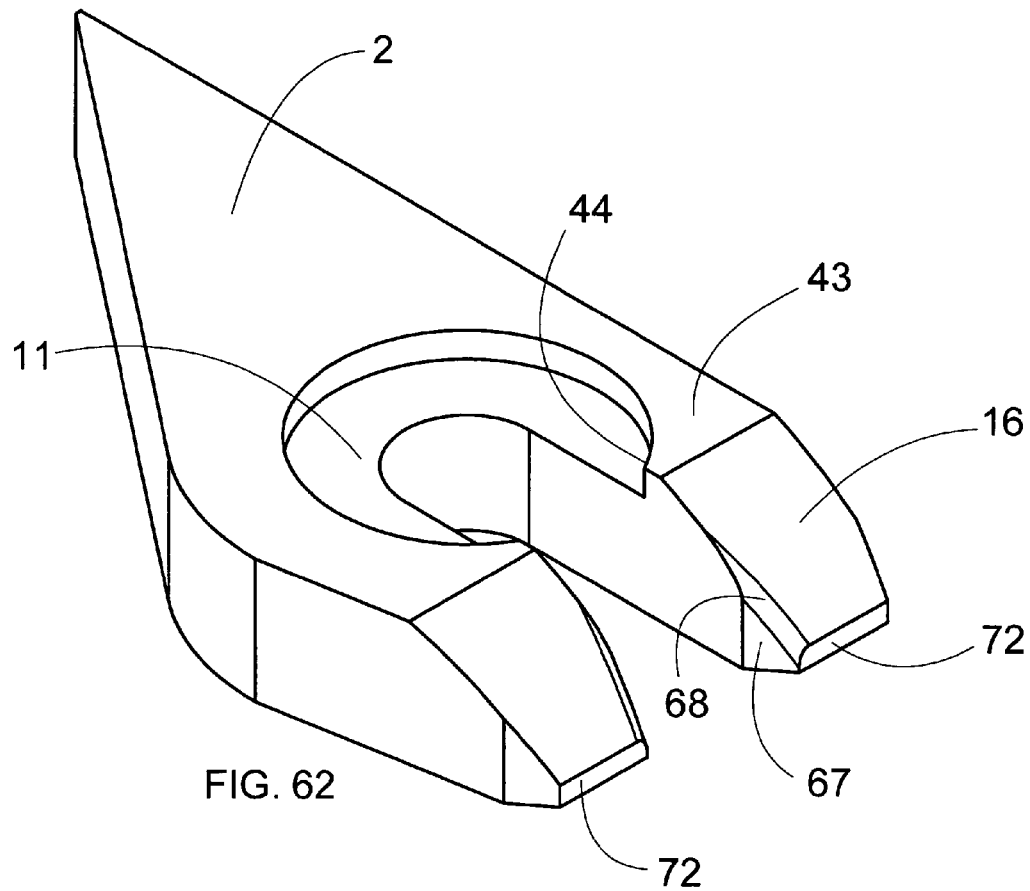
FIG. 62 is a perspective of a dropout with recess having ramps and bevels for automatically engaging the secondary retention system and facilitating the installation of the wheel.

FIG. 62 shows details of an embodiment of the fork dropout 2 which automatically engages the secondary locking system upon insertion of the wheel into the fork. As the wheel is inserted into the dropout, inboard cradle 54 and lockable adjusting nut 58 come into contact with slot hub centering ramp 67 and ramp intersection bevel 68 and as the wheel is further inserted, come into contact with dropout ramp 16. This series of surfaces serves to raise inboard cradle 54 and lockable adjusting nut 58 up and over dropout raised surface 43. Dropout blunt end 72 avoids having a sharp end which can cause damage to the shipping carton, floor, or rider when the wheel is not mounted on the fork. Inner dropout centering ramp 66 serves to center the hub 3 during wheel installation.

Figure 63:
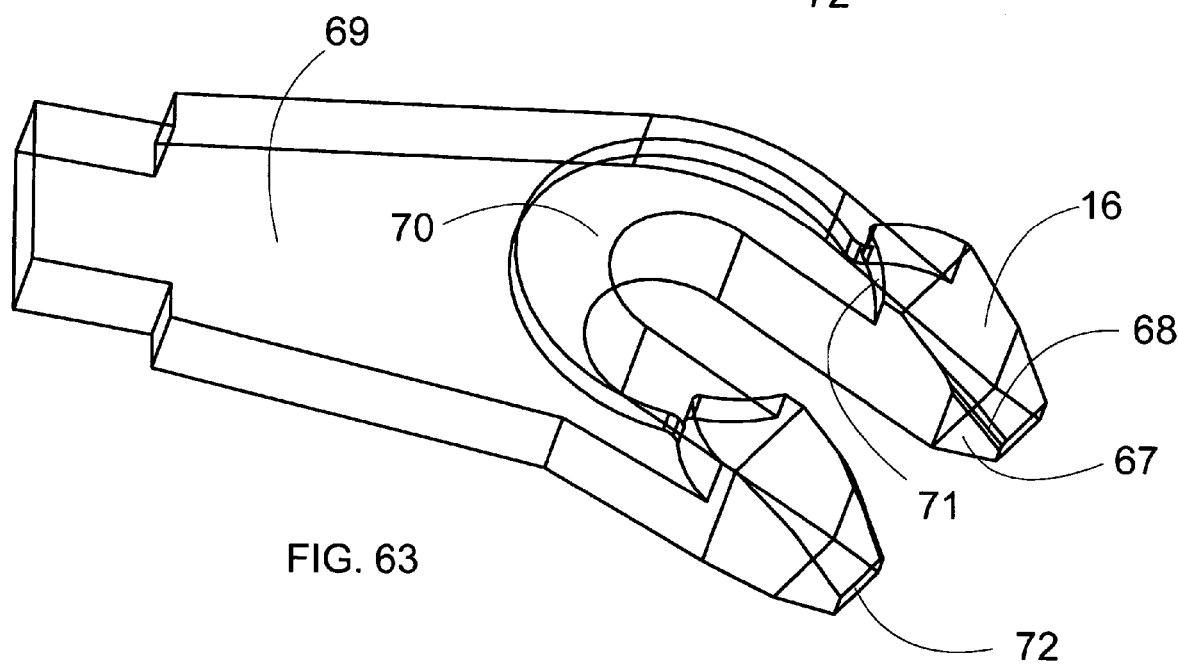
FIG. 63 is a perspective of a non-recessed dropout functioning in the same manner as the FIG. 62 dropout.

FIG. 63 shows a non-recessed dropout 69 with a non-recessed clamping area 70, and a non-recessed dropout safety tab 71 which functions the same as FIG. 62. The series of ramps make it possible to install a wheel easily only holding the bicycle and the wheel with no operations required in the hub area while the secondary retention system automatically clicks into place. Furthermore, the series of ramps also facilitates the centering of the wheel in the fork both in the front to back direction and the side to side direction. These detailed series of ramps can also be used on dropouts shown in FIGS. 7, 15, 32, 86, 87, and 88. The various dropouts are interchangeable, along with any number of other dropout shapes in any preferred embodiment.

Figure 64:
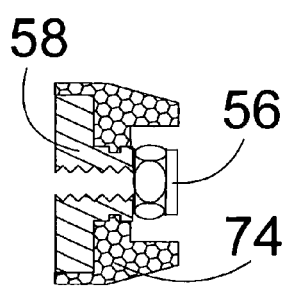
FIGS. 64 through 67 show various adjusting nuts and counter locking systems.
Figure 65:
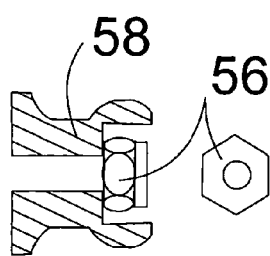
Figure 66:
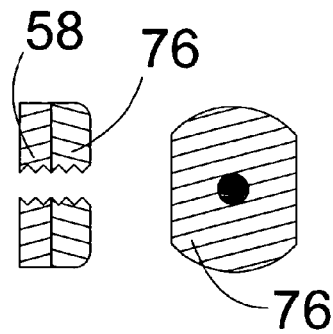
Figure 68:
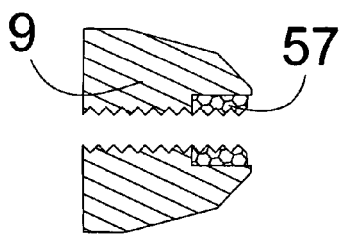
FIG. 68 is a cross-section of a standard adjusting nut with Nylock anti-vibration.

FIGS. 64 through 67 show details of the lockable adjusting nut 58. In all cases shown, some means of counter locking is used in combination with lockable adjusting nut 58. However, also shown in FIG. 68 is a standard adjusting nut with a nylock vibration stop found on many bikes today which can replace these locking nuts throughout this patent. FIG. 64 incorporates adjusting nut nylon cover 74 to reduce weight. FIG. 65 shows a single material lockable adjusting nut 58. FIG. 66 illustrates a modification which replaces counter locking nut with nylock 56 with a counter locking nut 76. Any of these nuts can be equipped with tool compatible surfaces if necessary.

Figure 67:
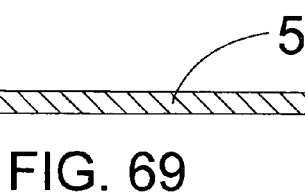
Figure 69:
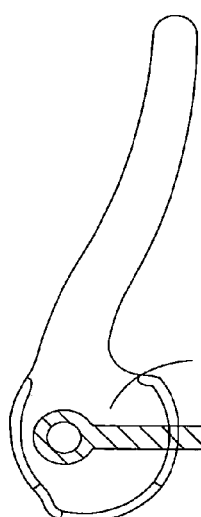
FIG. 69 is a cross-section of the quick release assembly with adjusting end nut.
Figure 70:
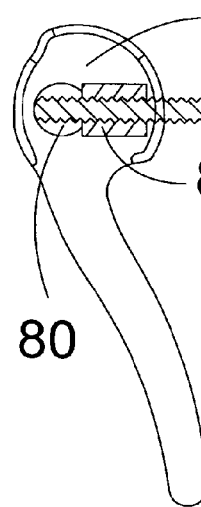
FIG. 70 is a cross-section of the quick release assembly showing a skewer with a monolithic skewer end and the wide throw quick release lever end being adjustable.

FIG. 67 shows a slip fit locking nut 78 which uses an adjusting nut set screw 30 which tightens against a non-threaded skewer surface 84. This avoids damage to the threads of skewer 5. FIG. 69 shows the assembly used with the lockable adjusting nut 58. FIG. 70 shows an alternative to the lockable adjusting nut 58 wherein the skewer 5 has a monolithic skewer end 79 and the adjustment is accomplished on the variable cam body 82 end using an adjustable and lockable cam axle 80 set against a cam axle counter locking nut 81. There are many variations not shown but possible in creating a system which is first adjustable, then lockable such that cam tension adjustment is not required for every use.

One of the primary uses of a quick release front wheel, is to enable the mounting of the bicycle to a vehicle for transportation. Current vehicle racks often do not provide either of the following items. First, they do not provide a secondary retention system which, if the operator forgets to lock the primary locking system, will automatically retain the bicycle on the vehicle rack. This is important as a bicycle can become a lethal projectile if it comes loose in a high speed situation. Second, when the user is attempting to lift and mount the bicycle on the roof rack using two hands, it is often difficult to release one hand holding the bike vertical on the stand in order to fasten the fork to the rack. This becomes even more difficult on taller vehicles or on vehicles parked on an inclined surface. It would therefore be beneficial to incorporate automatic secondary retention into a vehicle rack system.

FIGS. 71 through 74 illustrate an eighth preferred embodiment encompassing a rack system for mounting a bicycle to a vehicle. FIG. 71 shows bicycle rack for vehicle 85 holding a bicycle attached in the front to vehicle rack fork mount 86 and in the back to rear wheel mount 87. FIG. 72 shows a cross section of the bicycle fork 1 having been mounted to vehicle rack fork mount 86 centered with the aid of vehicle rack fork mount beveled edge 88. The mounting process is the same as when the wheel hub is mounted, in that the fork, when it is mounted on vehicle rack fork mount 86, automatically engages the secondary retention on the rack, before variable cam body 82 and quick release integral cam arm 22 are operated to provide the primary locking. Adjusting nut 9 is shown rather than lockable adjusting nut 58 as users may use multiple bicycles on the rack requiring some adjustment for proper cam tension. However, either nut, or another nut, can be used.

FIG. 73 is a cross section of vehicle rack fork mount 86 in its unlocked position and ready to accept a bicycle fork. FIG. 74 is a section of a front wheel mount which, for clarity, is not shown in FIG. 71 but can be attached to bicycle rack for vehicle 85. vehicle rack wheel mount 89 automatically fastens the front wheel using vehicle rack wheel mount ramped dropout 90 to engage the secondary retention while vehicle rack wheel mount malleable surface 91 allows for wheels with different pre-set adjustments to be clamped using quick release integral cam arm 22. Not shown but obvious to those skilled in the trade is a system without any ramps which requires the forced manual engagement of a secondary retention system rather than the shown automatic engagement of a secondary retention system. Also not shown, but obvious to those skilled in the trade are the use of other primary and secondary systems shown in this patent with a vehicle rack system.

FIGS. 75 through 80 show a ninth preferred embodiment wherein wheel removal is accomplished by simply opening quick release integral cam arm 22 and then pushing inward on variable cam body 82. This preferred embodiment is similar to the embodiment shown in FIGS. 28 through 34. FIGS. 75 through 78 are a sequence of sections showing the removal of the wheel. FIG. 75 shows the system in the locked riding condition. FIG. 76 shows quick release integral cam arm 22 having been unlocked and modified outboard cradle 93 springs outward staying in contact with variable cam body 82. FIG. 77 shows pushing inward on variable cam body 82 thereby releasing the secondary retention system. FIG. 78 shows continued pushing inward on variable cam body 82 while the process of wheel removal is begun. Once the secondary retention system has cleared dropout restraining surface 44, then the continued pushing inward on variable cam body 82 is no longer necessary to complete wheel removal. FIG. 79 shows a detailed section of the two part quick release cradle in the riding condition as shown in FIG. 75 where push release trigger 92 is threaded onto skewer 5 (not shown) and adjusted to the correct position for release of the secondary retention system. Push release trigger 92 is concentric inside malleable cradle insert 59 and modified outboard cradle 93. When variable cam body 82 is pushed inward, two things happen, push release trigger 92 rotates pivot lever 96 which lifts inboard cradle outer part 97 outboard to clear dropout restraining surface 44, and skewer 5 pushes lockable adjusting nut 58 outboard such that it also clears dropout restraining surface 44 during wheel removal. Inboard cradle inner part 95 has a diameter that fits and slides along dropout recess slide 21 (shown in FIG. 15) while inboard cradle outer part 97 does not fit through dropout recess slide 21 and must be raised up and over in order for wheel removal to be accomplished.

A detailed view of the two part cradle of FIGS. 77 and 78 is shown in FIG. 80 where variable cam body 82 is pushed allowing for wheel removal. The fork required for this ninth preferred embodiment is as shown in FIG. 15. It will be obvious to those skilled in the trade that are a wide variety of other means for achieving lifting of both secondary retention devices using a single push on one side of the skewer 5.

Figure 81:
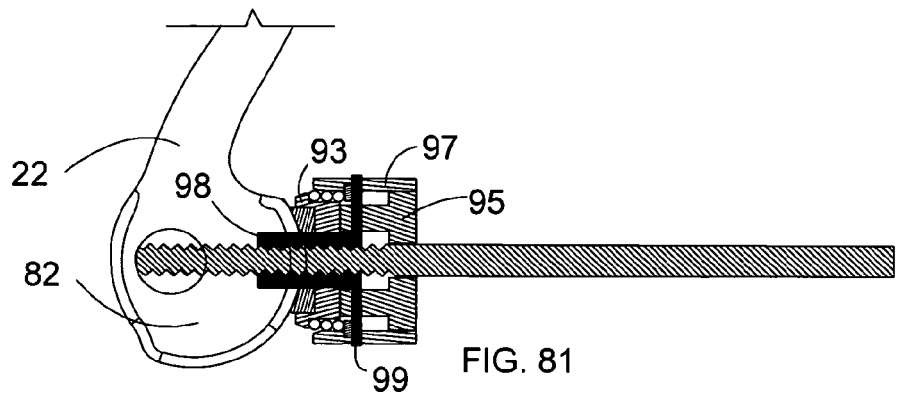
FIGS. 81 through 84 are a sequence showing part of a wheel fastening system where the secondary retention is released by pushing the quick release inward and then turning it.
Figure 82:
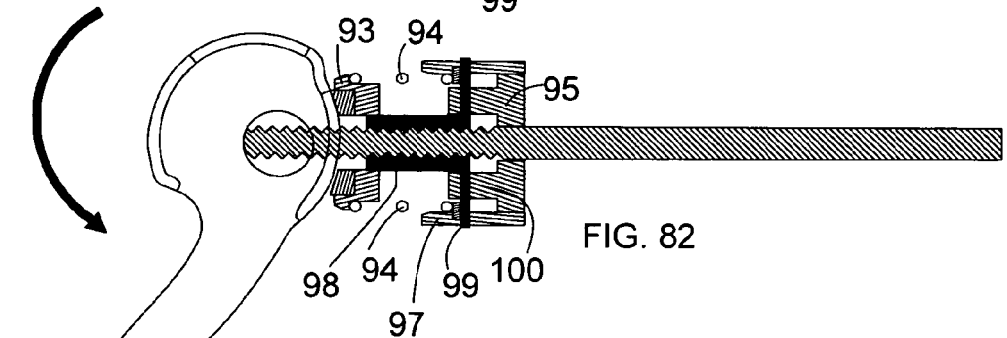
Figure 83:
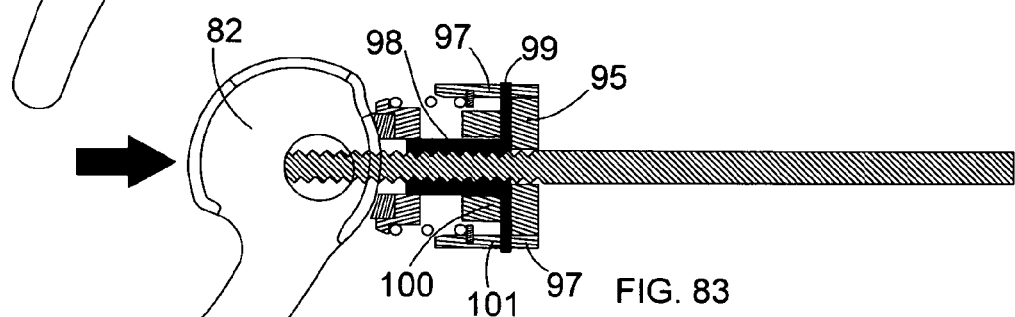
Figure 84:
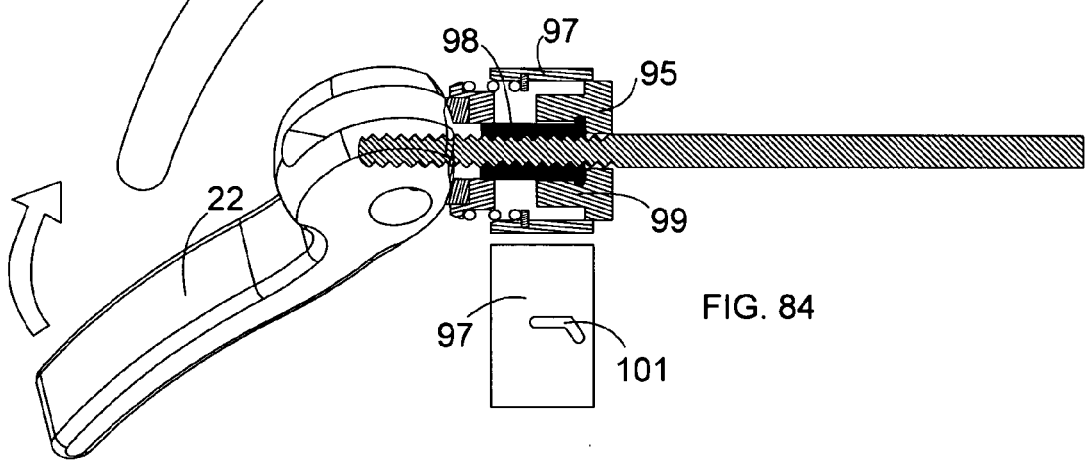

FIGS. 81 through 84 illustrate a tenth preferred embodiment similar to FIGS. 75 through 80 wherein wheel removal is accomplished by simply opening quick release integral cam arm 22 and then pushing inward and rotating variable cam body 82. FIGS. 81 through 84 are a sequence of sections showing the quick release side operations during the removal of the wheel. FIG. 81 shows the system in the locked riding condition. FIG. 82 shows quick release integral cam arm 22 having been unlocked. FIG. 83 shows variable cam body 82 being pushed inboard causing modified push release trigger 98 along with trigger pin 99 to move down inboard cradle inner part "L" shaped cut 100 (not shown) and inner cradle outer part lifting cut 101 until they contact inboard cradle inner part 95 and stop. FIG. 84 then shows the rotation of quick release integral cam arm 22 which also rotates modified push release trigger 98 and trigger pin 99 while inboard cradle inner part 95 does not rotate due to being squeezed between modified push release trigger 98 and the dropout. Inboard cradle inner part 95 may have a high friction inboard surface to help avoid unwanted rotation. Inboard cradle outer part 97 is rotationally fixed to inboard cradle inner part 95 and therefore can only raise up and out of the dropout recess as trigger pin 99 pushes and slides along inner cradle outer part lifting cut 101. Trigger pin 99 remains in contact with inboard cradle outer part 97 but this contact is not shown in the section. This system, as is the case with the ninth preferred embodiment, also uses a fork dropout as shown in FIG. 15. This push and turn system could also be used with a quick release head not rotationally fixed to the skewer, and, as shown in FIG. 85, where the skewer resists rotation relative to the axle/wheel. Obvious to those skilled in the trade are a wide variety of other mechanisms (not shown) and methods which employ the opening of a cam quick release, then a secondary movement of that quick release which disengages a secondary retention system. This secondary movement can be a pushing, a pulling, a push and twist, a pull and twist, a further continuation of the "flip-over-the-top" operation, etc. Such second movement of the quick release can cause the releasing of a secondary retention device on both sides of the wheel.

FIG. 85 shows a rotation resistant skewer 102 which in this case is hexagonally shaped, which fits inside a corresponding shaped fitted hub axle 106 such that the two are rotationally fixed together. In addition, outboard cradle 52 and rotation resistant cam axle 83 are also rotationally fixed to rotation resistant skewer 102 thereby allowing for a half pipe cradle surface 64 which cannot inadvertently rotate relative to variable cam body 82. This system is also beneficial as the weight of the bicycle discourages the turning of fitted hub axle 106 relative to the dropout and therefore also discourages the turning of rotation resistant skewer 102. This then allows a turning knob to be threaded onto the end of rotation resistant skewer 102 without turning rotation resistant skewer 102 as shown in following preferred embodiments.

As indicated, the general bicycle user population has some difficulty in turning a quick release system in order to micro-adjust for proper cam operation, and then using the "flip-over-the-top" operation of the cam. Either of these two operations by itself however, is not difficult to understand. The previous preferred embodiments require "flip-over-the-top" operation with no rotation. The following preferred embodiments require only simple rotation for locking the primary and secondary. However, simple manual rotation generally does not produce the same level of clamping force that a "flip-over-the-top" cam quick release can produce. Therefore a novel system which can offer safe and effective wheel retention with a lower clamping force is desirable.

FIGS. 86 through 88 are three views of the same fork dropout which incorporates a novel dropout inclined hub mounting bulge 103 on the inboard hub-side of the dropout. This dropout is used with a hub with a corresponding shape. A particular shape is shown, however, a wide variety of non-flat marrying surfaces can be used to accomplish the same fastening. The dropout inclined hub mounting bulge 103 offers greater resistance to micro-movement between the hub and the dropout than a flat surface when the primary fastening device is locked. In addition, the inclined surfaces also offer a secondary retention device in that, in order for the wheel to exit the dropouts, there must be sufficient room for the fork blades to bend in an outboard direction during wheel removal and clear the fastening mechanism. There also must be sufficient pulling force applied to the wheel in a wheel-removal direction to spread the fork blades. It has been found that this force is better applied to the tire/rim area for unilateral distribution.

Unlike previous systems, this system is preferably centered using a spring on each side of the hub. In all previous embodiments, once the secondary retention system is held manually disengaged, the wheel has no further obstacles to exiting the fork. When using a dropout with dropout inclined hub mounting bulge 103, gravity no longer easily removes the wheel. It must be forcibly removed. Unlike prior art secondary retention systems which were essentially a binary function, either retaining, or not retaining with no middle ground, this dropout inclined hub mounting bulge 103 offers a secondary retention system which uses a resistance to wheel removal that is overcome by a larger force.

FIGS. 89 through 94 show an eleventh preferred embodiment using turning knob 104 to lock the primary retention while a variation of secondary retention devices are shown. FIG. 89 shows a system where turning knob 104 cannot be turned in a loosening manner unless dropout catch finger lever 111 is held open such that dropout catch projection 110 no longer holds back rotation stop catch 109 from rotating. Turning knob cap nut 105 prevents turning knob 104 from being turned too far. Fitted hub axle 106 prevents rotation resistant skewer 102 from rotating while turning knob 104 is rotated.

Unlike previous systems, there are multiple secondary retention systems shown. One secondary retention is the dropout catch finger lever 111, and another one is the dropout inclined hub mounting bulge 103 which is resistant to movement relative to hub recess 107. The dropout catch finger lever 111 is manually disengaged while unscrewing turning knob 104. As riders often reverse the direction of the wheel as mounted on the fork, dropout catch finger lever 111 should be installed on both dropouts as shown. A rotation resistant skewer 102 is shown however if a standard skewer 5 were used, dropout catch finger lever 111 could be used to resist rotation of monolithic skewer end 79 while turning knob 104 was turned. Back rotation stop catch 109 is configured such that when tightening turning knob 104, operation of dropout catch finger lever 111 is not required.

Not shown but obvious to those skilled in the trade are a wide variety of other mechanisms which either resist or stop unwanted loosening rotation of turning knob 104.

Figure 94:
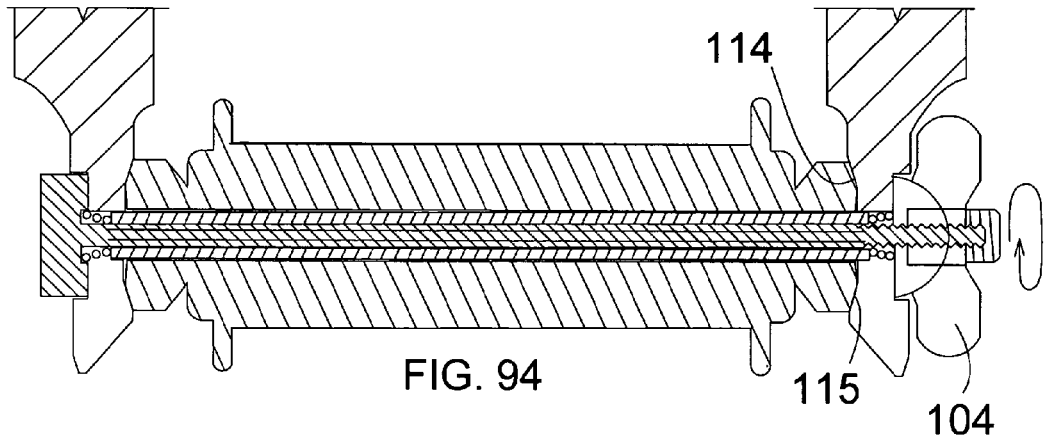
FIG. 94 is a cross-section showing the rotation resistant skewer and turning knob with the inclined mounting bulge on the hub instead of the dropout.

FIG. 90 is a side view of turning knob 104 and dropout catch finger lever 111. FIG. 91 shows a system similar to FIG. 89 except the secondary retention comprises a dropout spring loaded ball bearing 113 which presses against high friction surface 112 to avoid unwanted loosening rotation. FIG. 92 shows the high friction surface 112 and FIG. 93 shows a possible placement of dropout spring loaded ball bearing 113. FIG. 94 is similar to FIG. 93 however, no restraining is applied to unwanted loosening rotation of turning knob 104, and the only secondary retention provided is a dropout hub mounting Recess 114 which houses a hub inclined mounting bulge 115. Obvious to those skilled in the art are the wide variety of non-flat corresponding hub and dropout mounting surface non-flat shapes which resist wheel removal.

Figure 95:
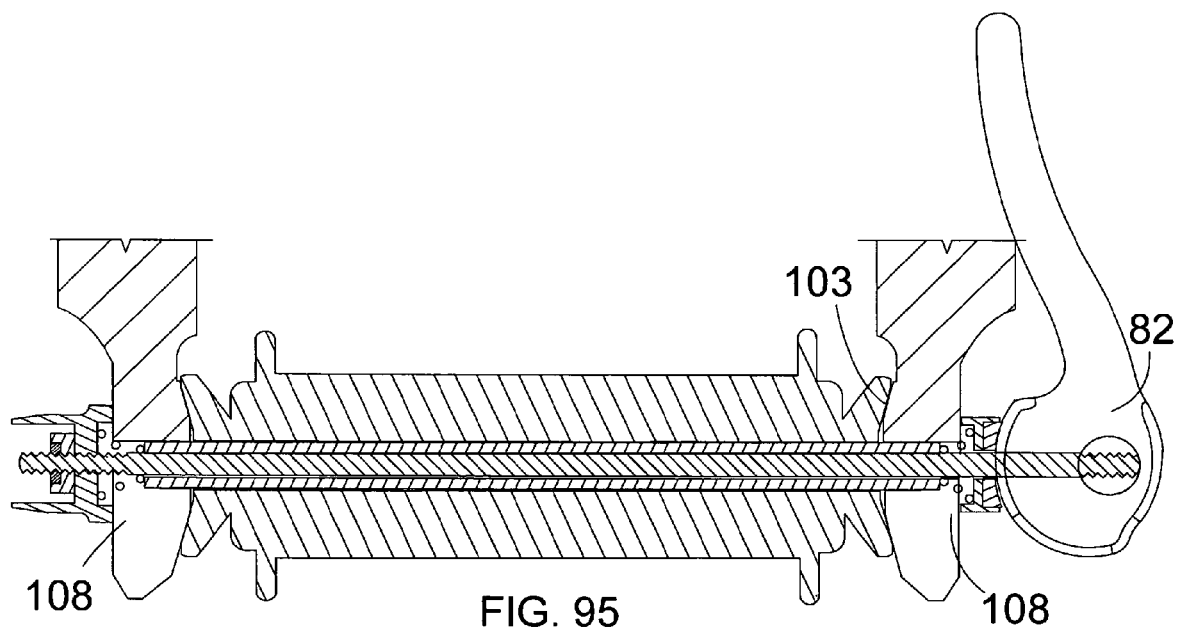
FIG. 95 is a cross-section showing dropouts with the inboard inclined mounting bulge where the outboard surfaces are without the standard recesses and a wide throw quick release.

FIG. 95 shows a variable cam body 82 which clamps on a non-recessed dropout 108 and has enough "throw" to clear dropout inclined hub mounting bulges 103. The secondary retention offered by dropout inclined hub mounting bulge 103 is shown but not required when used with the secondary retention shown in the following figures.

All embodiments discussed herein use a secondary retention system which acts upon the fork dropout. In operating these various embodiments, a traditional rim oriented braking system must usually be disengaged in order to allow enough clearance for the tire to exit the brake. With traditional rim braking systems, if the hub accidentally exits the dropouts, the rim mounted brake often will engage the tire causing some stopping of wheel spinning. In some cases, the brake pad may engage the tire before the hub axle exits the dropouts which results in the immediate stop of wheel rotation and will likely throw the rider over the handlebars. While all wheel embodiments shown have some form of automatic, or forced manual secondary retention, there is no automatic reminder to re-fasten the front brake. Therefore having a system where secondary wheel retention and front brake refastening are combined and are both automatic, or are both forced to be manually re-engaged, would be ideal.

Figure 96:
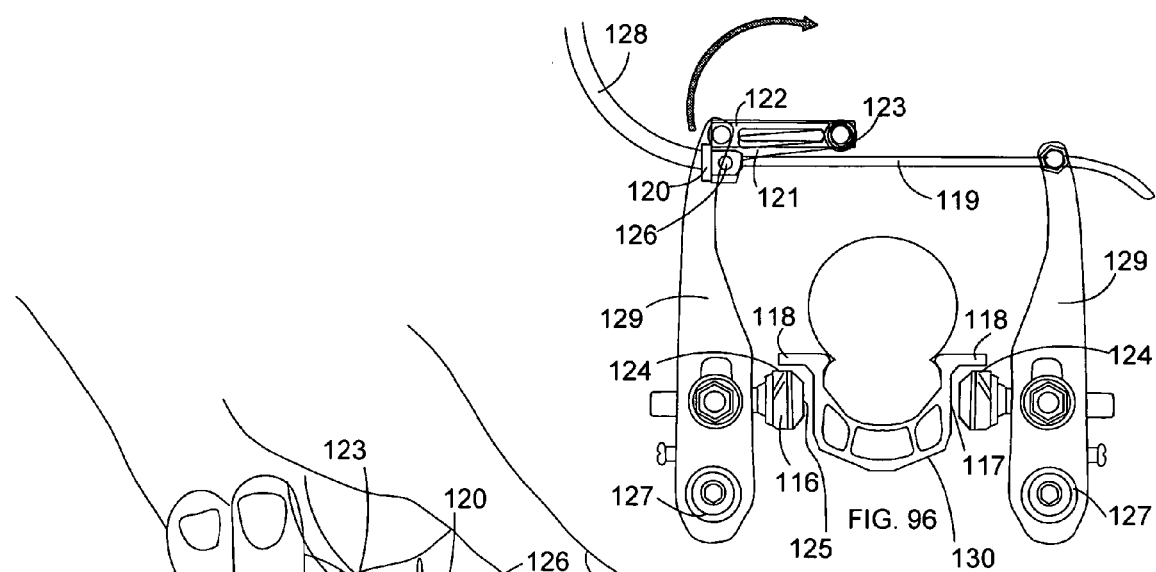
FIGS. 96 through 98 show a novel wheel retention and brake engagement system sequence where the secondary wheel retention system is not in the dropout/hub/quick release area.
Figure 97:
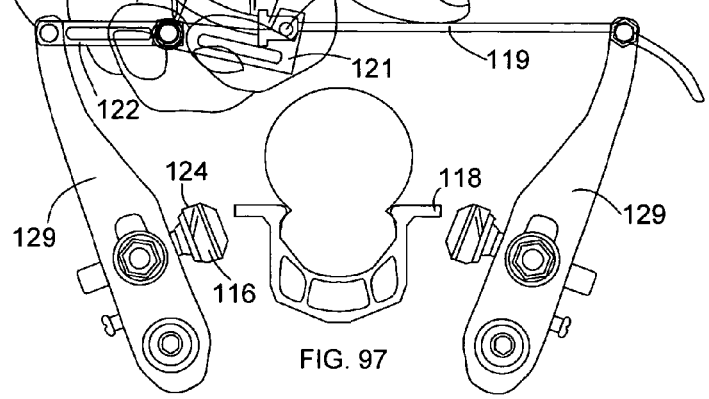

FIGS. 96 through 98 show a sequence of wheel removal. FIG. 96 shows the wheel and front brake in the riding condition. When the brake is activated, the two brake arches 129 move inboard such that brake pads 116 with high friction brake pad surfaces 125 act against rim braking surface 117 to slow or stop the bicycle. Rim secondary wheel retention mechanism 118 is set at a distance above low friction surface 124 where said distance is less than the distance required for the hub to move for hub axle exit from the dropouts. Brake cable 119 extends to the brake control lever (not show) inside brake cable housing 128 which ends at brake cable housing stop 120 which is pivotally mounted in first crble Release unit 121 using housing stop pivot 126. Second cable release unit 122 pivotally joins to one end of first cable release unit 121 with a cable release spring 123 urging brake cable housing stop 120 and first cable release unit 121 into the position shown in FIG. 96. Brake arch 129 is continuously urged away from rim braking surface 117 by brake arch spring 127. In order to disengage the brake, and thereby disengage the secondary wheel retention system, the left side of first cable release unit 121 is lifted and pivoted up, over, and around cable release spring 123 in a clockwise direction as shown. Cable release spring 123 resists the motion as first cable release unit 121 moves from its position shown in FIG. 96 to its position shown in FIG. 97.

Therefore, in a hands-off state, first cable release unit 121 and the entire assembly will always spring back to the configuration as shown in FIG. 96 overcoming the two brake arch springs 127. First cable release unit 121, in the position shown in FIG. 96, tends to want to rotate further counter-clockwise around cable release spring 123 when the brakes are applied and brake cable 119 is tightened. However, further rotation in this direction is not possible as first cable release unit 121 hits against second cable release unit 122. Not shown is an optional catch which would need to be released in order to rotate first cable release unit 121.

FIG. 97 shows first cable release unit 121 having been manually rotated around cable release spring 123 and loading cable release spring 123 to a position where brake arches 129 are rotated outboard and rim secondary wheel retention mechanism 118 will no longer hit low friction surface 124 when the wheel is removed. Low friction surface 124 allows the wheel to continue to spin even when it contacts rim secondary wheel retention mechanism 118 in the case where the primary wheel retention inadvertently allows the wheel to begin to separate from the fork dropouts during riding.

FIG. 98 shows a hand continually holding cable release spring 123 loaded and brake arch 129 open while the wheel is being removed. When the hand releases hold on first cable release unit 121, brake cable housing 128, second cable release unit 122, and brake cable 119, the system will immediately spring back to the configuration shown in FIG. 96. In other words, the system must be manually held disengaged while the wheel is removed. When the wheel is again inserted into the fork, the system can either require that it be manually separated as shown, or it can be ramped such that separation during wheel installation is automatic. In this way, both secondary retention of the front wheel in the fork dropouts, as well as engagement of the front brake are simultaneous, and become unavoidable events.

Not shown is a situation where first cable release unit 121 is in the position shown in FIG. 96 and the wheel is forcibly attempted to be removed. In this case, rim secondary wheel retention mechanism 118 hits against low friction surface 124 and does not allow the wheel to exit the fork dropouts, and does allow the wheel to continue to rotate for riding.

This system can be used with a wide variety of primary wheel retention systems. FIG. 95 shows a system with dropout inclined hub mounting bulge 103 and thus has two secondary retention systems when combined with the system shown in FIGS. 96 through 98. A simple small throw quick release (similar to quick release head 6) with a standard adjusting nut 9 and a dropout with no dropout recess 11 and a flat hub mounting surface, could be used in combination with FIGS. 96 through 98. Any other embodiment in this patent could also be combined with FIGS. 96 through 98. The system shown in FIGS. 96 through 98 could also be retrofitted onto existing bicycles for automatic or forced manual wheel retention and brake re-fastening/functioning.

Not shown is a braking system using a different profile of rim and operating on optional rim braking surface 130 which does not require rim secondary wheel retention mechanism 118. This would allow the use of conventional profile rims and could facilitate retrofitting of existing bicycles. Also not shown is a system where the rim is equipped with rim secondary wheel retention mechanism 118, however a standard conventional brake cable routing is used, and the wheel can only be removed when the brake is released in the standard way.

It will be obvious to those skilled in the trade that are a wide variety of system where the brake cable is elongated at the brake arches, at the brake lever, or another location. Also not shown is a secondary system separate from the front brake, where a blocking means acts on the wheel as the secondary retention. This could be used with a conventional front cantilever, disc, or hydraulic brake. Finally, not shown is a system where the brake is released in order to get the wheel off with a single action which does not require it to be continually held in the open state, but the act of installing the wheel again causes to brake to be engaged again. This could be done by having the tire or the rim operate a lever as the wheel is inserted into the fork which then automatically engages the brakes.

Furthermore, not shown, is a system where the brake cable length to the brake lever is not changed, but a braking unit which pivots out of the way when the wheel is inserted, and is manually pivoted out of the way when the wheel is removed, is considered. Again, in this case, in a hands-off state, the brake would automatically pivot back to the operating/riding state.

While this invention has been described in the context of a number of preferred embodiments, it will be apparent to one of ordinary skill, that based on this disclosure modifications of the embodiments may be effectuated but are still within the overall scope of this invention. No attempt has been made to exhaust the realm of possibilities, but rather to disclose the essential aspects of this invention.

What is claimed:

1. A bicycle comprising: a wheel having an axle, a front fork having a pair of wheel mounts, a primary locking system which does not rely solely on spring tension for securing the wheel to the wheel mounts and a secondary retention system for retaining the wheel on both wheel mounts, said primary locking system and said secondary retention system each comprise means for removing a wheel by manual operation exclusively from the same side of the wheel by unlocking said primary locking system which then remains in the unlocked position with no manual assistance, and means for holding said secondary retention system manually disengaged for initial movement of said wheel to completely remove said wheel from both of said wheel mounts.

2. A bicycle of claim 1, wherein said secondary retention system comprises means for automatically engaging the wheel to said wheel mounts when said wheel is inserted into the wheel mounts.

3. A bicycle of claim 2 wherein said wheel mounts further comprise means for automatically engaging said secondary retention system during mounting of a wheel axle into said wheel mounts.

4. A bicycle of claim 3, wherein said means for automatically engaging said secondary retention system comprises at least one ramped surface on one of said wheel mounts.

5. A bicycle of claim 1, wherein said secondary retention system is biased to require manual operation allowing the wheel to engage the wheel mounts.

6. A bicycle of claim 1, wherein said secondary retention system is biased to automatically remain engaged and retain the wheel in the wheel mounts.

7. A bicycle of claim 1, wherein said secondary retention system is disengaged for wheel axle removal from the wheel mounts by movement in a direction parallel to the wheel axle.

8. A bicycle of claim 7, wherein said axle comprises a skewer biased toward one end.

9. A bicycle of claim 8, further comprising: said primary locking system having a locking member mounted on one end of the skewer, a secondary retention component mounted on said skewer inboard of said primary locking member, whereby wheel removal is accomplished by simultaneously pulling said secondary retention component outward and pushing said locking member inward in-line with said skewer.

10. A bicycle of claim 9, wherein said secondary retention component further comprises a quick release cam, cam follower and a cavity on its outboard edge to house said cam follower.

11. A bicycle of claim 10, wherein said secondary retention system is disengaged for wheel removal by squeezing said secondary retention component and said cam follower together.

12. A bicycle of claim 10, wherein said axle comprises a skewer and said quick release cam and said secondary retention system are configured such that adjustment of the tension of said skewer for correct cam operation is not required each time the wheel axle is installed on said wheel mounts.

13. A bicycle of claim 8, wherein said secondary retention component further comprises a tactile pulling area.

14. A bicycle of claim 8, further comprising a cam follower and a spring concentrically mounted about said skewer between said secondary retention component and said cam follower whereby said spring urges said secondary retention component toward said wheel mount and said spring urges said cam follower toward said primary locking member.

15. A bicycle of claim 7, further comprising a skewer, a primary locking member and a threaded nut installed on the opposite end of said skewer from said primary locking member whereby a portion of said secondary retention system is disengaged by pushing on said primary locking member which causes said threaded nut to move from a position where it, at least partially, engages the wheel to the wheel mounts, to a position where it no longer engages the wheel to the wheel mounts.

16. A bicycle of claim 7, further comprising a primary locking member, a skewer, and a threaded nut installed on the opposite end of said skewer from said primary locking member wherein said threaded nut further encompasses a cavity on its outboard side for housing means, which move independently from said threaded nut, for preventing said threaded nut from threading off the end of the skewer.

17. A bicycle of claim 16, wherein said means for preventing comprises a locking nut which may be used to prevent rotation of the threaded nut by counter-rotating the locking nut and the threaded nut against one another.

18. A bicycle comprising: a frame, a front fork mounted on said frame, said front fork having a pair of wheel mounts, a front wheel, a single primary lock for securing said wheel to the wheel mounts and, a secondary retention system which retains said wheel to both wheel mounts, wherein both the single primary lock and the secondary retention system include means for removing the wheel solely on one and the same side of the wheel and wherein the secondary retention system comprises means for automatically engaging when the wheel enters both of said wheel mounts to retain the wheel on both of the wheel mounts and wherein removal of said wheel from both of said wheel mounts requires manual disengagement of said secondary retention system.

* * * * *